United States Patent
Araki et al.

(10) Patent No.: US 9,667,346 B2
(45) Date of Patent: May 30, 2017

(54) OPTICAL TRANSMISSION SYSTEM, WAVELENGTH CONTROL METHOD AND NODE

(71) Applicant: FUJITSU LIMITED, Kawasaki-shi, Kanagawa (JP)

(72) Inventors: Hirofumi Araki, Kawasaki (JP); Taku Saito, Kawasaki (JP); Yoshitaka Taki, Kawasaki (JP); Satoru Miyazaki, Setagaya (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/987,106

(22) Filed: Jan. 4, 2016

(65) Prior Publication Data

US 2016/0204875 A1   Jul. 14, 2016

(30) Foreign Application Priority Data

Jan. 13, 2015 (JP) .................................. 2015-004052

(51) Int. Cl.
  *H04B 10/00* (2013.01)
  *H04B 10/572* (2013.01)
  (Continued)

(52) U.S. Cl.
  CPC ..... *H04B 10/572* (2013.01); *H04B 10/07957* (2013.01); *H04J 14/02* (2013.01)

(58) Field of Classification Search
  CPC .. H04B 10/572; H04B 10/07957; H04J 14/02
  See application file for complete search history.

(56) References Cited

U.S. PATENT DOCUMENTS

| 5,920,414 A * | 7/1999 | Miyachi | H04B 10/506 |
| | | | 398/14 |
| 2010/0329697 A1* | 12/2010 | Koizumi | H03J 7/26 |
| | | | 398/208 |

(Continued)

FOREIGN PATENT DOCUMENTS

| JP | 8-321825 | 12/1996 |
| JP | 2012-23607 | 2/2012 |

(Continued)

*Primary Examiner* — Danny Leung
(74) *Attorney, Agent, or Firm* — Staas & Halsey LLP

(57) ABSTRACT

An optical transmission system includes: a transmission node to transmit wavelength-multiplexed light of a plural wavelengths arranged in a predetermined transmission band; and a reception node to receive the wavelength-multiplexed light, and to include a monitor to monitor a detection sensitivity indicating a sampling phase shift with respect to a phase of light corresponding to one among the received plural wavelengths, and a transmitter to transmit information indicating that the monitored detection sensitivity for light corresponding to a wavelength adjacent to an outer edge of the transmission band, among the plural wavelengths, has been reduced below a threshold value, to the transmission node, wherein the transmission node includes a receiver to receive information indicating a reduction in the detection sensitivity, and a controller to stop wavelength control of shifting the wavelength adjacent to the outer edge in a direction approaching the outer edge in response to reception of the information.

13 Claims, 25 Drawing Sheets

(51) Int. Cl.
*H04B 10/079* (2013.01)
*H04J 14/02* (2006.01)

(56) References Cited

U.S. PATENT DOCUMENTS

| | | | | |
|---|---|---|---|---|
| 2011/0170881 A1* | 7/2011 | Nakashima | .......... | H04B 10/697 |
| | | | | 398/209 |
| 2011/0200339 A1* | 8/2011 | Komaki | ................ | H04B 10/61 |
| | | | | 398/208 |
| 2012/0051754 A1* | 3/2012 | Sakamoto | ............ | H04B 10/032 |
| | | | | 398/115 |
| 2012/0195602 A1* | 8/2012 | Nakashima | ............. | H04L 7/027 |
| | | | | 398/204 |
| 2012/0213510 A1* | 8/2012 | Stojanovic | ........... | H04B 10/613 |
| | | | | 398/25 |
| 2012/0308227 A1* | 12/2012 | Komaki | ........... | H04B 10/25073 |
| | | | | 398/25 |
| 2016/0204875 A1* | 7/2016 | Araki | .................. | H04B 10/572 |
| | | | | 398/34 |

FOREIGN PATENT DOCUMENTS

| | | |
|---|---|---|
| JP | 2012-49964 | 3/2012 |
| JP | 2012-160888 | 8/2012 |

* cited by examiner

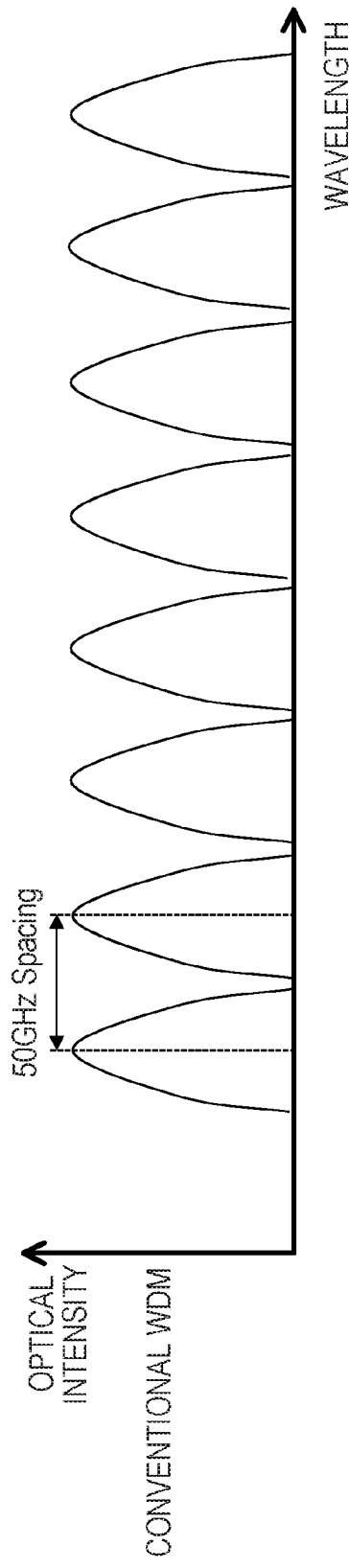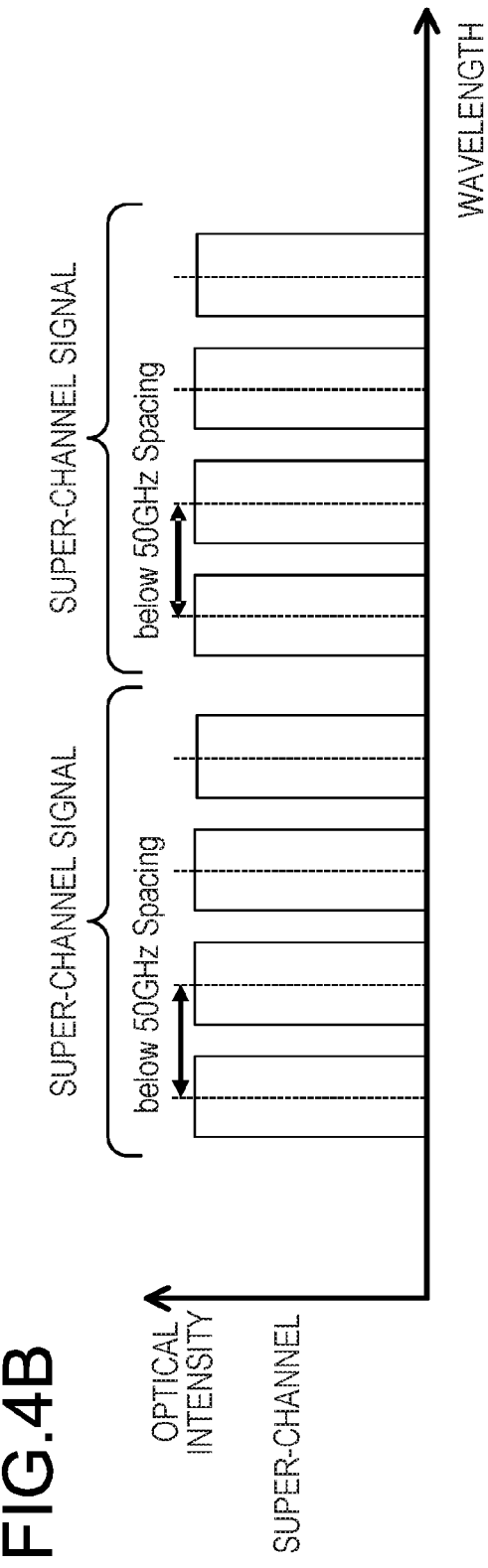

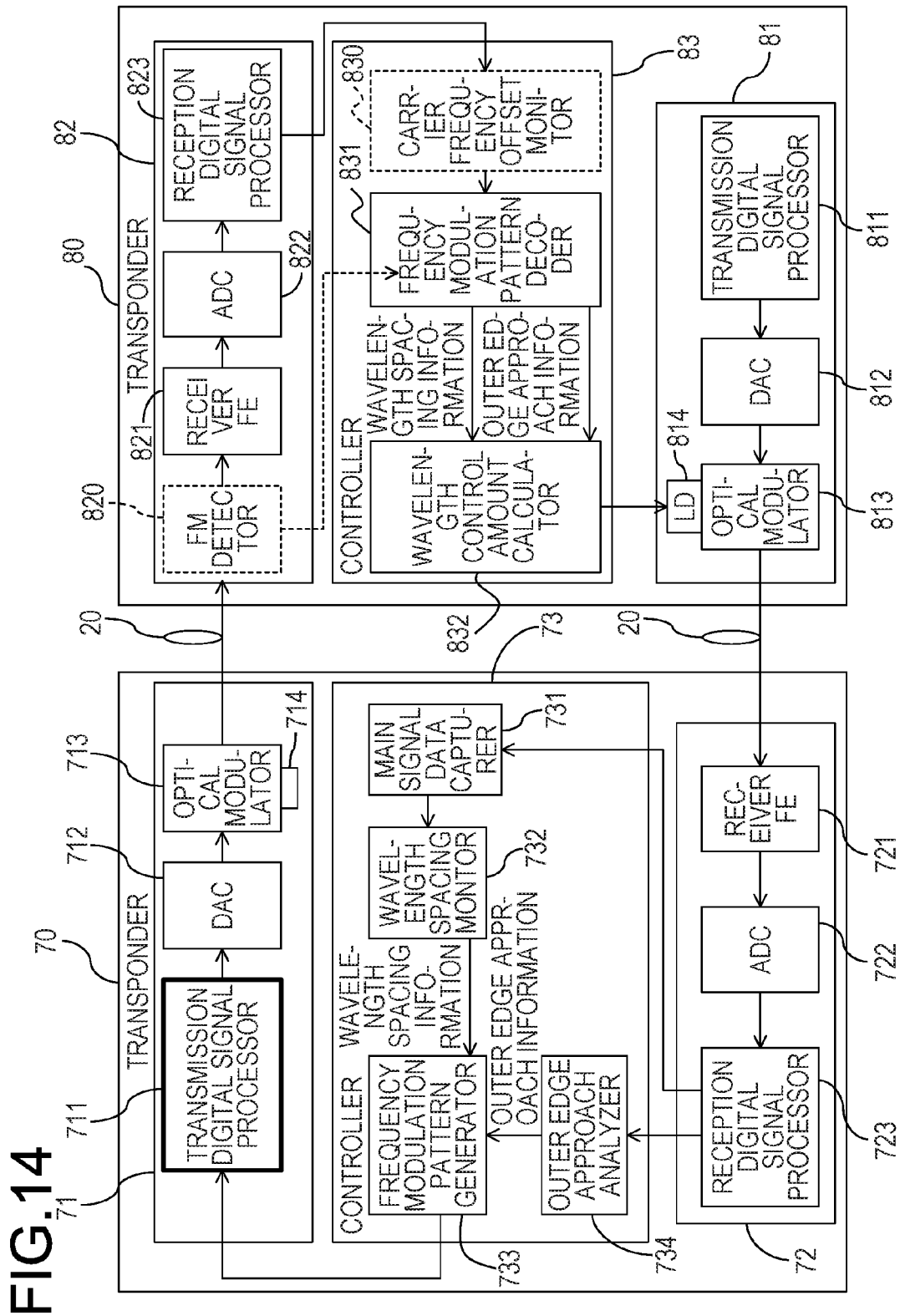

OPTICAL TRANSMISSION SYSTEM, WAVELENGTH CONTROL METHOD AND NODE

CROSS-REFERENCE TO RELATED APPLICATION

This application is based upon and claims the benefit of priority from the prior Japanese Patent Application No. 2015-004052, filed on Jan. 13, 2015, the entire contents of which are incorporated herein by reference.

FIELD

The embodiments discussed herein are related to an optical transmission system, a wavelength control method, and a node.

BACKGROUND

As one of optical communication techniques, there is a technique for wavelength multiplexing of light having plural wavelengths (may be referred to as "channels") with high density and transmitting the wavelength-multiplexed light. Such an optical transmission technique may be referred to as "super-channel transmission."

In the super-channel transmission, by narrowing the spectrum of the signal light to be transmitted by using digital signal processing, a channel spacing may be more narrowed than that in conventional wavelength division multiplexing (WDM) transmission. Therefore, it is possible to improve the frequency utilization efficiency of an optical transmission band available in an optical transmission system.

Related techniques are disclosed in, for example, Japanese Laid-open Patent Publication No. 2012-160888, Japanese Laid-open Patent Publication No. 2012-049964, Japanese Laid-open Patent Publication No. 2012-023607 and Japanese Laid-open Patent Publication No. 08-321825.

SUMMARY

According to an aspect of the invention, an optical transmission system includes: an optical transmission node configured to transmit wavelength-multiplexed light of a plurality of wavelengths arranged in a predetermined transmission band; and an optical reception node configured to receive the wavelength-multiplexed light, and to include a monitor configured to monitor a detection sensitivity indicating a sampling phase shift with respect to a phase of light corresponding to one among the plurality of wavelengths in the received wavelength-multiplexed light, and a transmitter configured to transmit information indicating that the detection sensitivity monitored by the monitor for light corresponding to a first wavelength adjacent to a first outer edge of the transmission band, among the plurality of wavelengths, has been reduced below a first threshold value, to the optical transmission node, wherein the optical transmission node includes a receiver configured to receive information indicating a reduction in the detection sensitivity, and a controller configured to stop wavelength control of shifting the first wavelength adjacent to the first outer edge in a direction approaching the first outer edge in response to reception of the information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of a channel arrangement of a conventional WDM optical signal, and FIG. 4B is a diagram illustrating an example of a channel arrangement of a super-channel signal;

FIG. 14 is a block diagram illustrating an exemplary configuration of a transponder of a first embodiment;

DESCRIPTION OF EMBODIMENTS

Figure 1:
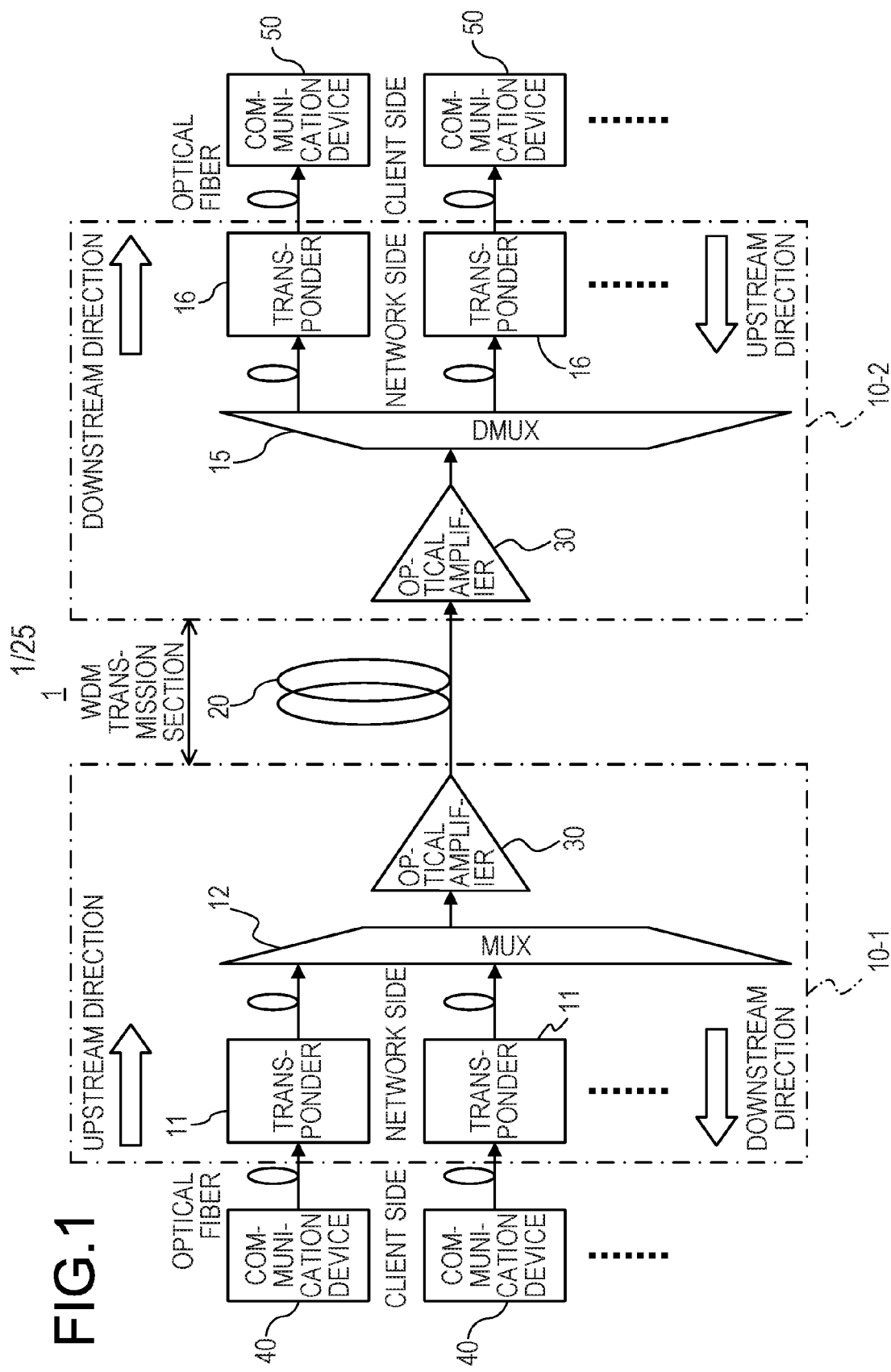
FIG. 1 is a block diagram illustrating an exemplary configuration of a WDM optical network as an example of an optical transmission system.

When the channel spacing is narrowed in order to improve the frequency utilization efficiency as in the super-channel transmission, the transmission quality of any one channel may easily be deteriorated as compared with the conventional WDM transmission when the wavelength control of each channel is not properly carried out. In the worst case, a signal interruption of the channel may occur.

Hereinafter, embodiments of techniques for properly controlling the wavelength of the signal light (wavelength-multiplexed light) including the light of plural wavelengths will be described with reference to the accompanying drawings. However, the embodiments to be described below are merely illustrative and are not intended to exclude various modifications and applications of techniques not specified below. Further, the embodiments to be described below may be carried out appropriately in combination. In the drawings used in the following embodiments, portions denoted by the same reference numerals, unless otherwise specified, represent the same or like parts.

In recent years, as the traffic of communication devices is increased, a demand for even larger capacity and higher speed of network is increasing. For example, in an optical transmission apparatus as an example of an element of the optical network, a digital coherent signal processing technique using a dual polarization-quadrature phase shift keying (DP-QPSK) modulation scheme may be employed.

By employing the digital coherent signal processing technique, it is possible to increase the transmission speed per wavelength (which may be referred to as "channel") to, for example, 100 gigabits/sec (Gbps) or a speed higher than 100 Gbps.

Further, by using wavelength division multiplexing (WDM) technology in combination, the maximum transmission capacity of the optical network may be enlarged. For example, an optical signal of 100 Gbps per channel can be wavelength-multiplexed for up to 88 channels. That is, it is possible to enlarge the maximum transmission capacity per optical fiber to 8.8 terabits/sec (Tbps).

FIG. 1 illustrates an exemplary configuration of a WDM optical network as an example of an optical transmission system. A WDM optical network 1 illustrated in FIG. 1 includes, for example, an optical transmission apparatus 10-1 and an optical transmission apparatus 10-2 which is connected to the optical transmission apparatus 10-1 via an optical transmission line 20 to enable an optical communication with the optical transmission apparatus 10-1.

When the optical transmission apparatuses 10-1 and 10-2 are not to be distinguished from each other, the optical transmission apparatuses 10-1 or 10-2 may be simply referred to as an "optical transmission apparatus 10." The optical transmission apparatus 10 is an example of an element (network element NE) of the WDM optical network 1. An optical transmitting station, an optical receiving station, an optical relay station, an optical add-drop station such as a reconfigurable optical add/drop multiplexer (ROADM) or the like may be applicable to the NE 10. "Station" may be referred to as "node."

By way of example, in FIG. 1, the NE 10-1 corresponds to an optical transmitting station (optical transmitting node), and the NE 10-2 corresponds to an optical receiving station (optical receiving node).

The optical transmission line 20 is, for example, an optical fiber transmission line. In the optical transmission line 20, an optical amplifier 30 may be provided appropriately depending on a transmission distance of a WDM optical signal. A node provided with the optical amplifier 30 may be regarded as corresponding to an optical relay node. Meanwhile, depending on the transmission distance of the WDM optical signal, the optical amplifier 30 may not be provided as well.

The optical transmission apparatus 10-1 may include, as illustrated in FIG. 1, a plurality of transponders 11, a wavelength multiplexer (MUX) 12, and the optical amplifier 30.

Each of the transponders 11 may be connected to a communication device 40 such as a router or the like via an optical fiber 22. The communication device 40 is, for example, a communication device 40 on a client side (may be referred to as "tributary side"). A signal transmitted from the communication device 40 is converted into an optical signal of one wavelength (channel) after being received by the corresponding transponder 11, and is input to the multiplexer 12.

Meanwhile, an optical fiber may be used for the connection between each of the transponders 11 and the multiplexer 12. In other words, each of the transponders 11 and the multiplexer 12 may be optically connected to be enabled for an optical communication.

The multiplexer 12 may be a multiplexing coupler such as a WDM coupler, and generates a WDM optical signal by wavelength-multiplexing the optical signal received from each of the transponders 11 to transmit the WDM optical signal to the optical transmission line 20. In the transmission, the WDM optical signal may be amplified to a predetermined transmission optical power by the optical amplifier 30 provided at a rear stage (post-stage) of the multiplexer 12.

The WDM optical signal transmitted to the optical transmission line 20 is received by the optical transmission apparatus 10-2. The optical transmission apparatus 10-2 includes, for example, a wavelength demultiplexer (DMUX) 15 and a plurality of transponders 16. At a front stage (pre-stage) of the demultiplexer 15, the optical amplifier (pre-amplifier) 30 may be provided for amplifying the WDM optical signal received from the optical transmission line 20.

The demultiplexer 15 de-multiplexes the WDM optical signal input from the optical transmission line 20 for each wavelength and inputs the de-multiplexed signal to any one of the transponders 16. Meanwhile, in the case of a coherent reception in the transponders 16, the demultiplexer 15 may alternatively be an optical splitter that splits the WDM optical signal. The optical splitter may be a branched coupler.

Each of the transponders 16 photoelectrically converts an optical signal input from the demultiplexer 15 into an electrical signal, and transmits the electrical signal to a communication device 50 such as a router or the like. The communication device 50 is, for example, a communication device 50 on the client side.

Meanwhile, although a configuration focusing on the communication in a direction from the optical transmission apparatus 10-1 toward the optical transmission apparatus 10-2 has been illustrated in FIG. 1, the same configuration may be employed for the communication in a reverse direction as well. In other words, a bidirectional communication may be carried out between the optical transmission apparatus 10-1 and the optical transmission apparatus 10-2 (e.g., between the communication device 40 and the communication device 50).

The bidirectional communication may be carried out via the optical transmission line 20 provided separately for each of both directions between the optical transmission apparatus 10-1 and the optical transmission apparatus 10-2. For example, a reverse communication from the optical transmission apparatus 10-2 to the optical transmission apparatus 10-1 may be regarded as being implemented by a configuration in which, in FIG. 1, the optical transmission apparatus 10-1 and the optical transmission apparatus 10-2 are replaced with each other.

In the bidirectional communication, a direction in which the optical transmission apparatus 10-1 (or 10-2) transmits a WDM optical signal to the optical transmission line 20 is called an "upstream direction," and a reverse direction, i.e., a direction in which the optical transmission apparatus 10-1 (or 10-2) receives a WDM optical signal from the optical transmission line 20, is called a "downstream direction."

Therefore, each of the optical transmission apparatuses 10-1 and 10-2 may include a transmitting system corresponding to the upstream direction and a receiving system corresponding to the downstream direction. For example, in FIG. 1, the transponders 11 and the multiplexer 12 correspond to the transmitting system of the optical transmission apparatus 10-1, and the demultiplexer 15 and the transponders 16 correspond to the receiving system of the optical transmission apparatus 10-2.

In other words, it may be considered that the optical transmission apparatus 10-1 includes, although not illustrated in FIG. 1, as a receiving system, the demultiplexer 15 and the transponders 16, similarly to the receiving system of the optical transmission apparatus 10-2. Further, it may be considered that the optical transmission apparatus 10-2 includes, although not illustrated in FIG. 1, as a transmitting system, the transponders 11 and the multiplexer 12, similarly to the transmitting system of the optical transmission apparatus 10-1. However, the transponders 11 (or transponders 16) may be commonly used both for transmission and reception. In other words, the transponders 11 and 16 may have the same configuration (transmitting and receiving sections).

Figure 2:
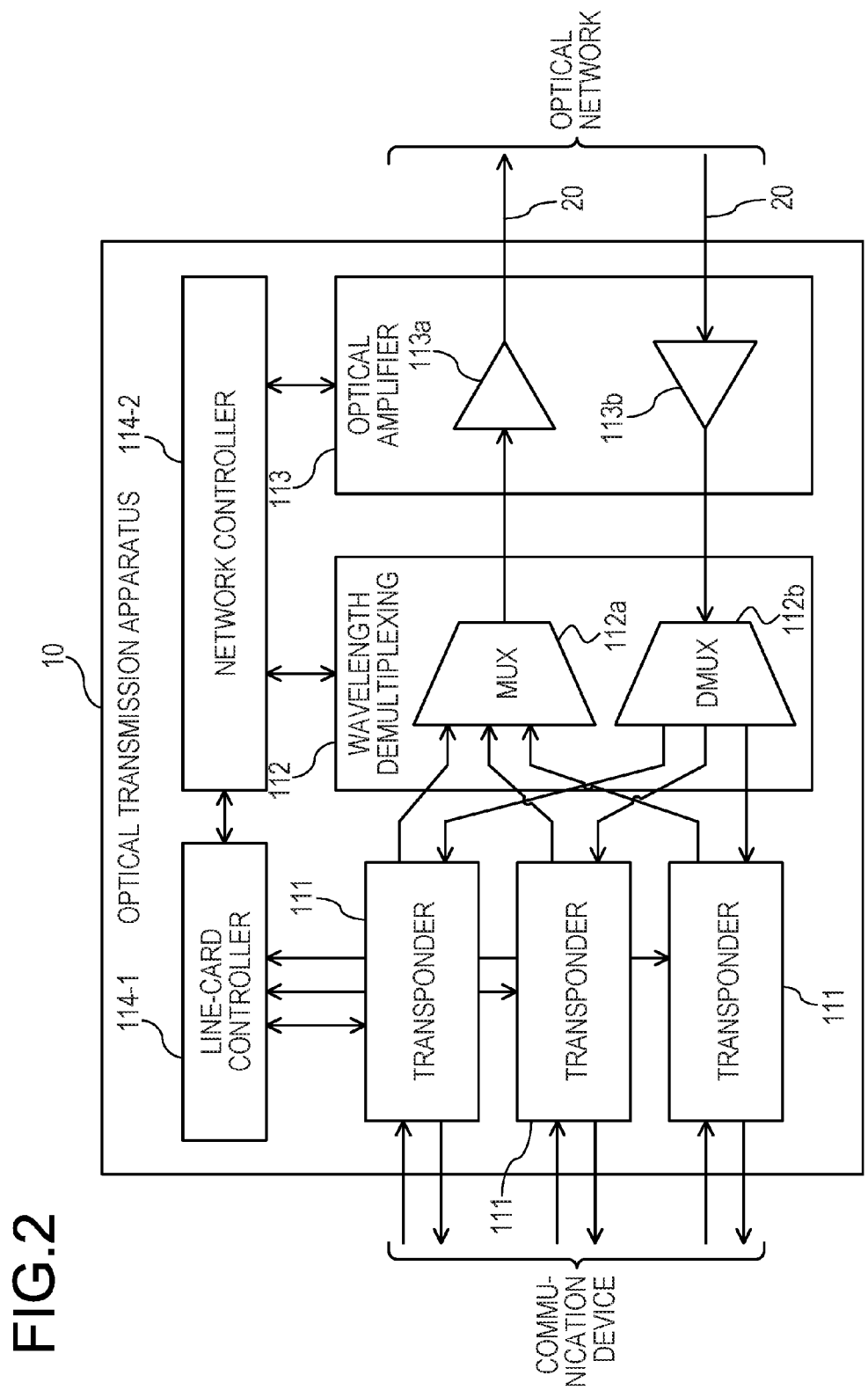
FIG. 2 is a block diagram illustrating an exemplary configuration of an optical transmission apparatus illustrated in FIG. 1.

FIG. 2 illustrates an exemplary configuration of the optical transmission apparatus 10 supporting a bidirectional communication. The optical transmission apparatus 10 illustrated in FIG. 2 includes, for example, a plurality of transponders 111, a wavelength demultiplexing block 112, an optical amplifier block 113, a line-card controller 114-1, and a network controller 114-2. Meanwhile, the "block" may be referred to as a "module."

Each of the transponders 111 corresponds to the transponder 11 (or 16) illustrated in FIG. 1. By way of example, each of the transponders 111 is optically connected to the communication device 40 (or 50) such as a router to enable a bidirectional communication, and can transmit and receive an optical signal to and from the communication device 40 (or 50).

Each of the transponders 111 may be regarded as an element of an "optical transmitter" of the optical transmission apparatus 10, and may be regarded as an element of an "optical receiver" of the optical transmission apparatus 10.

The wavelength demultiplexing block 112 includes, for example, a multiplexer 112a corresponding to the upstream direction, and a demultiplexer 112b corresponding to the downstream direction. It may be understood that the multiplexer 112a is equivalent to the multiplexer 12 illustrated in FIG. 1, and the demultiplexer 112b is equivalent to the demultiplexer 15 illustrated in FIG. 1.

An output port (a transmission port) of each of the transponders 111 is optically connected to an input port of the multiplexer 112a using an optical fiber or the like. Further, an input port (reception port) of each of the transponders 111 is optically connected to any one of output ports of the demultiplexer 112b using an optical fiber or the like.

Thus, the multiplexer 112a generates a WDM optical signal by wavelength-multiplexing an optical signal transmitted from the transmission port of each of the transponders 111. Further, the demultiplexer 112b de-muliplexes the WDM optical signal received from the optical amplifier block 113 for each wavelength and inputs the de-multiplexed signal to the reception port of each of the transponders 111.

The optical amplifier block 113 includes an optical amplifier 113a corresponding to the upstream direction, and an optical amplifier 113b corresponding to the downstream direction. The optical amplifier 113a amplifies the WDM optical signal input from the multiplexer 112a with a predetermined transmission power, and transmits the amplified signal to the optical transmission line 20. The optical amplifier 113b amplifies the WDM optical signal received from the optical transmission line 20 with a predetermined reception power, and inputs the amplified signal to the demultiplexer 112b.

In some cases, the optical amplifier block 113 may be unnecessary depending on the transmission distance of the WDM optical signal.

The line-card controller 114-1 is electrically or optically connected to each of the transponders 111 and performs a switching processing according to the destination of data received by the line-card controller 114-1. Thus, the "line-card controller" may be referred to as a "switching part" or a "switching board." The switched data is transmitted, via each of the transponders 111, to the side of the communication device 40 or the optical transmission line 20 (optical network).

The network controller 114-2 collectively controls the operations of the line-card controller 114-1, the wavelength demultiplexing block 112 and the optical amplifier block 113. The line-card controller 114-1 and the network controller 114-2 may be integrated as a single controller. If the line-card controller 114-1 and the network controller 114-2 may not be distinguished from each other, the line-card controller 114-1 or the network controller 114-2 may be simply referred to as a "controller 114."

The controller 114 may be implemented by using a processor device such as a Central Processing Unit (CPU) or Digital Signal Processor (DSP) having computing capabilities and a storage device such as a memory. The function of the controller 114 may be embodied by allowing the processor device to operate by appropriately reading data or a program (may be referred to as "software") according to the control stored in the storage device. The controller 114 may be implemented by using an Application Specific Integrated Circuit (ASIC), a Field Programmable Gate Array (FPGA) or the like.

Figure 3:
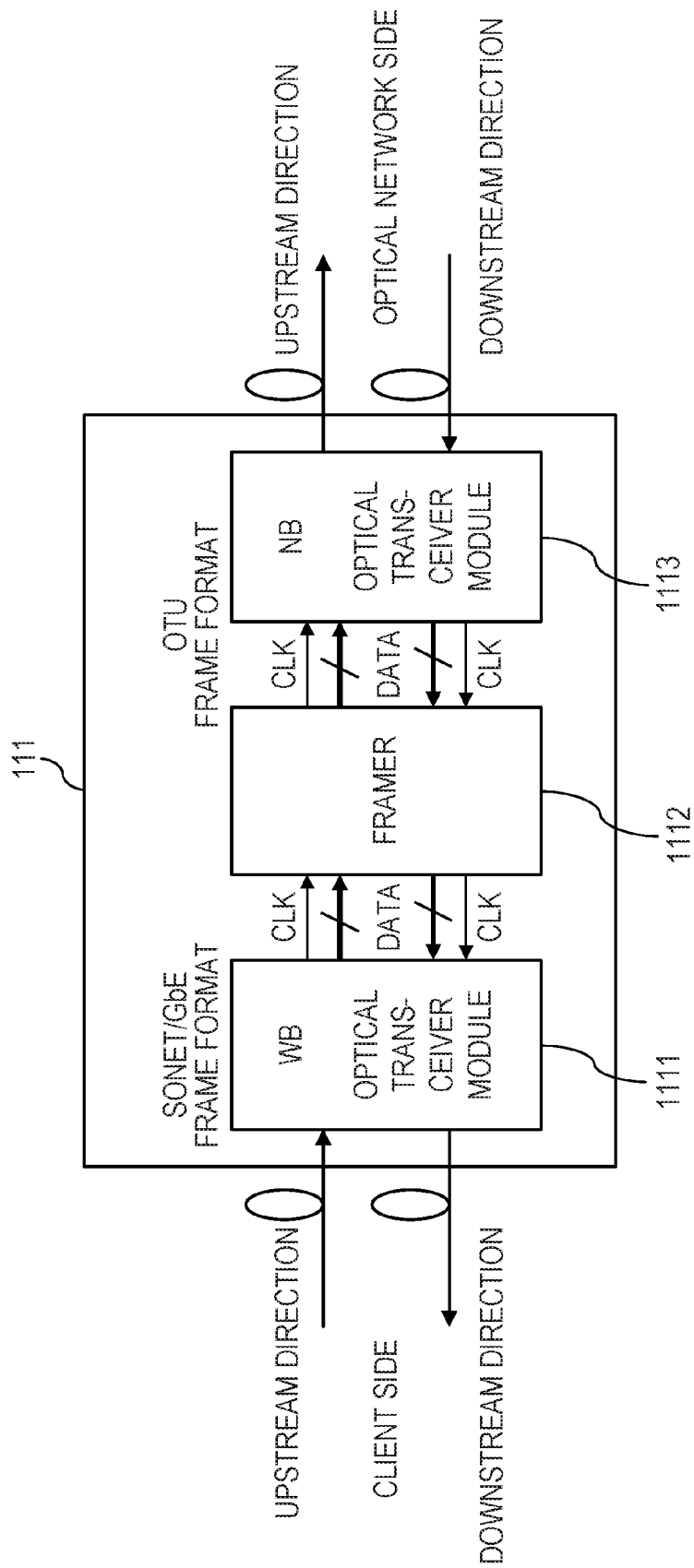
FIG. 3 is a block diagram illustrating an exemplary configuration of a transponder illustrated in FIG. 2.

FIG. 3 illustrates an exemplary configuration of the transponder 111 illustrated in FIG. 2. By way of example, the transponder 111 includes a wideband (WB) optical transceiver module 1111, a framer 1112, and a narrowband (NB) optical transceiver module 1113. The "optical transceiver module" may be referred to as "optical transceiver."

By way of example, the WB optical transceiver module 1111 transmits and receives a signal to and from the client-side communication device 40 (or 50) such as a router by using wideband light (hereinafter sometimes referred to as "WB light"). The signal transmitted and received by the WB light may be, for example, a frame signal used in synchronous optical network (SONET), Ethernet (registered trademark) or the like.

For example, the WB optical transceiver module 1111 converts the WB light received from the communication device 40 (or 50) into an electrical signal and inputs the electrical signal to the framer 1112. Further, the WB optical transceiver module 1111 converts the electrical signal received from the framer 1112 into WB light, and transmits the WB light to the communication device 40 (or 50).

By way of example, the framer 1112 maps the signal photoelectrically converted by the WB optical transceiver module 1111 to, for example, an optical channel transport unit (OTU) frame signal and inputs the OTU frame signal to the NB optical transceiver module 1113. Further, the framer 1112 demaps the frame signal of the SONET, Ethernet (registered trademark) or the like to be input to the WB optical transceiver module 1111. The frame signal is mapped to the OTU frame signal from the NB optical transceiver module 1113. The processing of the frame signal may include a process of adding such an error correcting code.

By way of example, the NB optical transceiver module 1113 transmits and receives a frame signal (e.g., OTN frame signal) to and from the optical transmission line 20 by using narrowband light (hereinafter sometimes referred to as "NB light").

For example, the NB optical transceiver module 1113 converts the OTU frame signal of the electrical signal, generated by the framer 1112, into NB light, and outputs the NB light to the multiplexer 112a illustrated in FIG. 2. Further, the NB optical transceiver module 1113 converts, for example, the OTN frame signal input as the NB light from the demultiplexer 112b illustrated in FIG. 2 into an electrical signal, and outputs the electrical signal to the framer 1112.

As described above, the transponder 111 enables a bidirectional communication between the communication device 40 and the communication device 50 through the conversion process of the light and the frame signal to be transmitted and received between the tributary side and the network (optical transmission line 20) side.

Meanwhile, in the optical transmission technology, for an even larger capacity, in addition to the WDM technology, the use of a technique called "super-channel" is being considered and discussed. In the previous WDM technology, a wavelength spacing has been set such that an inter-channel interference can be suppressed sufficiently. For example, as illustrated in FIG. 4A, in the case of the optical signal of 100 Gbps per channel, channels may be arranged at a spacing of about 50 GHz in the WDM optical signal.

In contrast, in the super-channel technology, by using a spectrum shaping processing through digital signal processing, it is possible to further narrow a channel spacing while suppressing the inter-channel interference. For example, by performing a convolution processing of a main signal (e.g., NRZ signal) by using a filter such as a raised cosine filter that exhibits a time response in a Sinc function shape, the frequency spectrum of the main signal light can be narrowed and shaped into a rectangular shape.

Thus, in the case of the optical signal of 100 Gbps per channel, for example, as illustrated in FIG. 4B, the channel spacing in the WDM optical signal can be approximated to a spacing narrower than 50 GHz (e.g., about 36 GHz).

Meanwhile, in a case where a variation (which may be referred to as a "fluctuation") occurs in the emission wavelength of a transmission light source (e.g., a laser diode LD), a margin may be set in the channel spacing in consideration of the fluctuation. For example, in a case where the emission wavelength of the LD varies in a certain frequency range (e.g., ±1.5 GHz) due to environmental conditions or a temporal change or the like, the frequency range may be set as the margin of the channel spacing. The variation of the emission wavelength of the LD may be referred to as End Of Life (EOL) variation.

If a frequency bandwidth per channel could be narrowed to 32 GHz by spectrum shaping processing, the frequency bandwidth per channel becomes 35 GHz considering a margin of ±1.5 GHz (3 GHz) as EOL variation. Thus, when each channel is arranged such that a guard band of 1 GHz is sandwiched between channels, the channel spacing becomes 36 GHz.

Here, it is assumed that multiple channels are arranged (multiplexed) in a certain frequency band such as, for example, a transmission band of a wavelength selection switch (WSS) through which the WDM optical signal passes (may be referred to as a "frequency grid"). Meanwhile, the WSS is an example of an optical device used in the optical transmission apparatus 10, and its transmission band is an example of a parameter which affects the transmission characteristics such as the band characteristics of the WDM optical signal.

In the transmission band of the WSS, a difference between a frequency corresponding to an edge of the transmission band and a frequency corresponding to an edge of the channel closest to the frequency may be referred to as an "outer peripheral margin." If a large outer peripheral margin is ensured, it is possible to suppress a degradation of the transmission characteristics in the multi-span transmission of the WDM optical signal.

Figure 5:
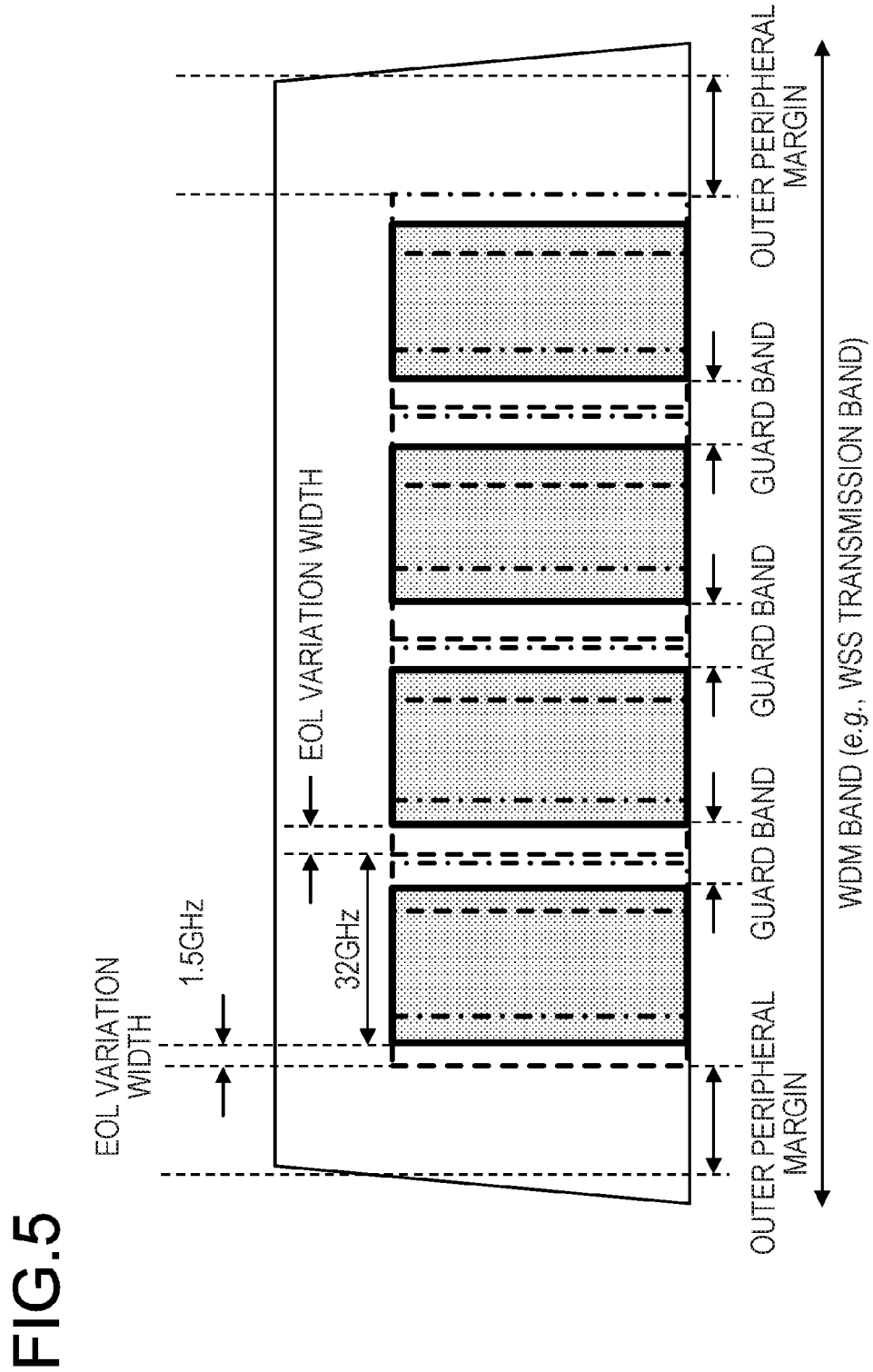
FIG. 5 is a view explaining an outer peripheral margin that can be ensured when a transmission wavelength control is not performed in the channel arrangement illustrated in FIG. 4B.

As a non-limiting example, as illustrated in FIG. 5, assuming that four channels are multiplexed in the frequency grid of 162.5 GHz, a margin of about 7.5 GHz is ensured as the outer peripheral margin.

However, the margin of this degree may lead to a non-negligible increase in degradation of the transmission characteristics in the multi-span transmission. In addition, the frequency utilization efficiency in this case only increases by about 23.1% as compared to the case of a channel spacing of 50 GHz in the conventional WDM transmission illustrated in FIG. 4A.

In order to practically realize the super-channel, it is desired to improve the transmission characteristics by ensuring the outer peripheral margin having a larger width.

Alternatively, for an even larger-capacity transmission, it is desired to further improve the frequency utilization efficiency.

Therefore, for example, by adaptively controlling the emission wavelength of the transmission LD during the operation of the optical network or the optical transmission apparatus, it may be considered that the outer peripheral margin that is ensured may be expanded by suppressing the fluctuation of the emission wavelength of the transmission LD.

In the channel arrangement of the super-channel illustrated in FIG. 5, if the wavelength control of the transmission LD is not implemented, as a variation of the transmission LD, it is required to consider the variation of four channels in a lateral direction (a total of eight locations) as a margin.

Figure 6:
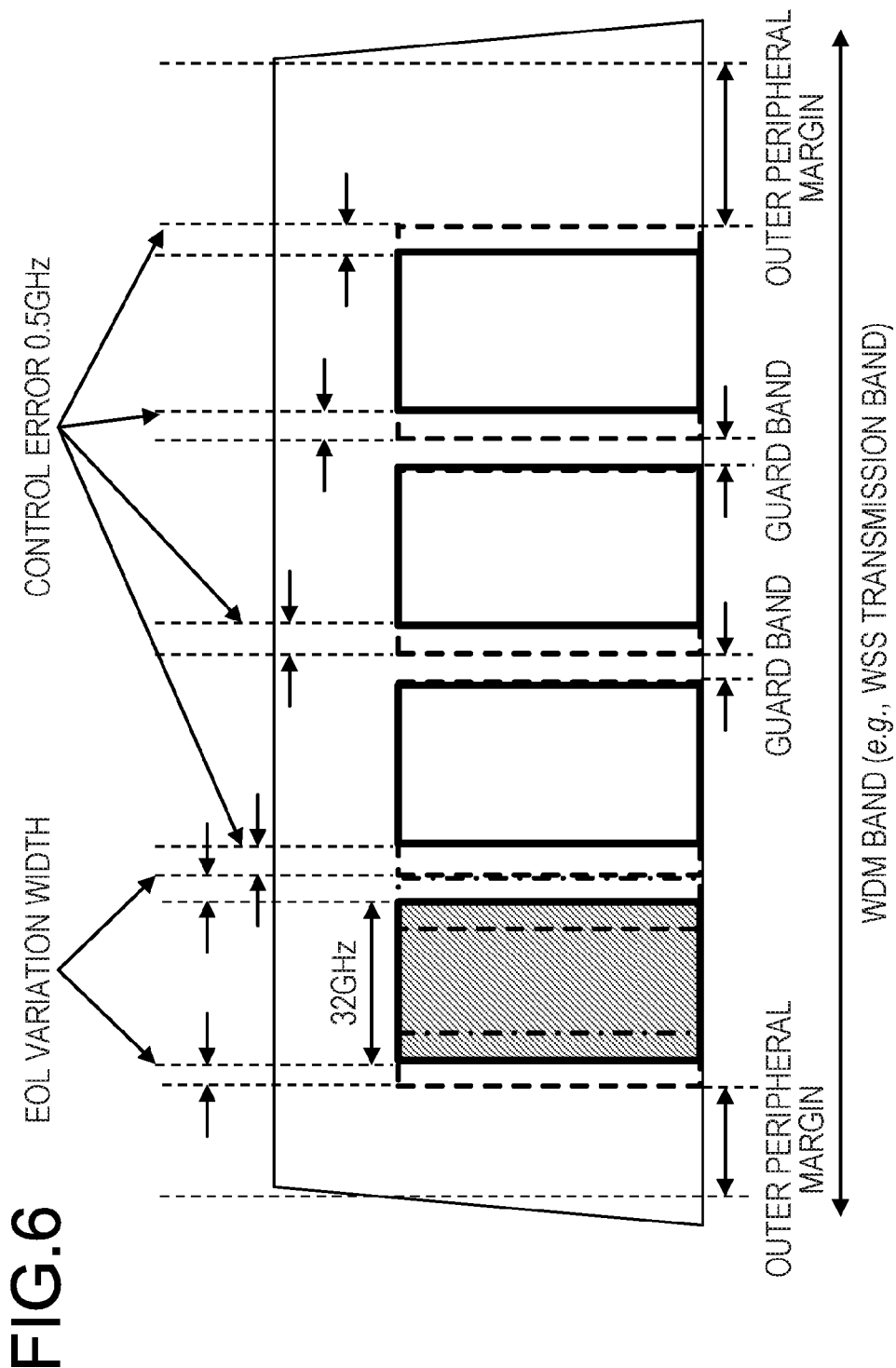
FIG. 6 is a view explaining an outer peripheral margin that can be ensured when a transmission wavelength control is performed in the channel arrangement illustrated in FIG. 4B.

In contrast, for example, as illustrated in FIG. 6, if the wavelength control of the transmission LD is implemented using one channel among four channels as a reference channel, the variation of the other three channels may not be expected to be considered as a margin. Meanwhile, the reference channel is a channel outside the scope of channels for the wavelength control. In other words, only the variation for the reference channel among the four channels may be expected to be considered as a margin. However, a wavelength control error (e.g., about 500 MHz) may be expected to be considered.

By implementing the wavelength control, for example, as represented in Example 1 in Table 1 below, it is possible to ensure about 11 GHz as the outer peripheral margin, thereby suppressing the degradation of the transmission characteristics in the multi-span transmission.

TABLE 1

| Specific example of channel arrangement | | | | | | |
|---|---|---|---|---|---|---|
| | Wavelength not controlled | | Wavelength controlled (Example 1) | | Wavelength controlled (Example 2) | |
| Required band | 162.5 GHz | | 162.5 GHz | | 150.0 GHz | |
| Number of channels | 4 CH | | 4 CH | | 4 CH | |
| Band utilization efficiency (compared to conventional) | 23.1% | | 23.1% | | 33.3% | |
| Signal band | 32.0 GHz | x4 | 32.0 GHz | x4 | 32.0 GHz | x4 |
| Light source variation | 1.5 GHz | x8 | 1.5 GHz | x2 | 1.5 GHz | x2 |
| Light source control error | 0.5 GHz | x0 | 0.5 GHz | x4 | 0.5 GHz | x4 |
| Guard band between channels | 2.5 GHz | x3 | 2.5 GHz | x3 | 2.5 GHz | x3 |
| Outer peripheral margin | 7.5 GHz | x2 | 11.0 GHz | x2 | 4.8 GHz | x2 |

Alternatively, as represented in Example 2 in Table 1, although the outer peripheral margin that can be ensured is smaller than that in Example 1, it becomes practically possible to multiplex four channels with a grid of 150.0 GHz. In Example 2, it is possible to greatly improve the frequency utilization efficiency (e.g., 33.3%) as compared to 23.1% in Example 1.

Next, a transmission signal and a reception signal of the super-channel will be described with reference to FIG. 7. Each of transmitters A1, B1, C1, and D1 illustrated on the upper left of FIG. 7 may be regarded as being equivalent to, for example, a transmitter in the upstream direction provided in the NB optical transceiver module 111 illustrated in FIGS. 2 and 3.

Figure 7:
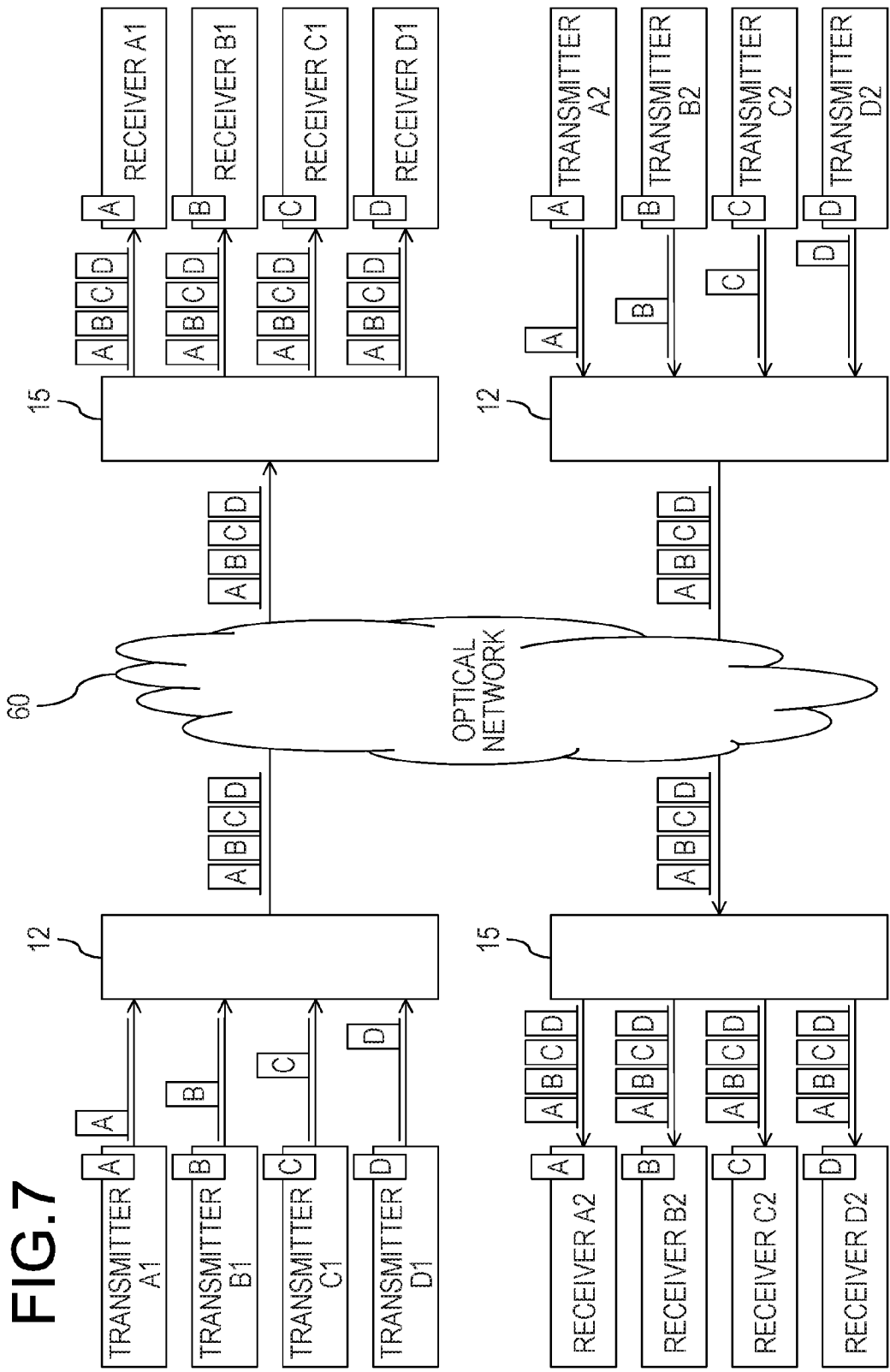
FIG. 7 is a block diagram explaining a multi-channel reception in the optical transmission system illustrated in FIG. 1.

In addition, each of receivers A1, B1, C1, and D1 illustrated on the upper right of FIG. 7 may be regarded as being equivalent to, for example, a receiver in the downstream direction provided in the NB optical transceiver module 1113 of the transponder 111 illustrated in FIGS. 2 and 3.

Furthermore, each of transmitters A2, B2, C2, and D2 illustrated on the lower right of FIG. 7 may be regarded as being equivalent to, for example, a transmitter in the upstream direction provided in the NB optical transceiver module 1113 of the transponder 111 illustrated in FIGS. 2 and 3.

In addition, each of receivers A2, B2, C2, and D2 illustrated on the lower left of FIG. 7 may be regarded as being equivalent to, for example, a receiver in the downstream direction provided in the NB optical transceiver module 1113 of the transponder 111 illustrated in FIGS. 2 and 3.

Optical signals A to D transmitted from the transmitters A1, B1, C1, and D1 (A2, B2, C2, and D2) are wavelength-multiplexed into a WDM optical signal forming a super-channel in the aforementioned multiplexer 12 and transmitted to an optical network 60.

Meanwhile, the optical signals A to D may be regarded, respectively, as optical signals having wavelengths corresponding to emission wavelengths $\lambda_A$ to $\lambda_D$ of the transmission light sources of the transmitters A1, B1, C1, and D1 (A2, B2, C2, and D2). The wavelengths $\lambda_A$ to $\lambda_D$ forming the super-channel may be referred to as "sub-channels" or "sub-carriers." Further, the optical network 60 may be regarded as a concept including the optical transmission line 20 and the optical amplifier 30 illustrated in FIG. 1.

The transmission signal (WDM optical signal) of the super-channel transmitted to the optical network 60 is divided by the demultiplexer 15 into the number of branches corresponding to the number of the receivers A1, B1, C1, and D1 (A2, B2, C2, and D2) and input to the receivers A1, B1, C1, and D1 (A2, B2, C2, and D2), respectively.

In other words, the receivers A1, B1, C1, and D1 (A2, B2, C2, and D2) receive the same WDM optical signal into which the optical signals A to D are wavelength-multiplexed. This reception may be referred to as "multi-channel reception" or "multi-carrier reception."

Each of the receivers A1, B1, C1, and D1 (A2, B2, C2, and D2) includes a local oscillation light source (e.g., LD) used in the coherent reception. The emission wavelength of the local oscillation light source is consistent with the emission wavelength of the corresponding transmission source of the transmitters A1, B1, C1, and D1 (A2, B2, C2, and D2). In the following description, the emission wavelength of the transmission light source may be referred to as a "transmission wavelength," and the emission wavelength of the local oscillation light source may be referred to as a "reception wavelength."

For example, the reception wavelength of the receiver A1 (A2) is consistent with the transmission wavelength $\lambda_A$ of the transmitter A1 (A2), and the reception wavelength of the receiver B1 (B2) is consistent with the transmission wavelength $\lambda_B$ of the transmitter B1 (B2). Similarly, the reception wavelength of the receiver C1 (C2) is consistent with the transmission wavelength $\lambda_C$ of the transmitter C1 (C2), and the reception wavelength of the receiver D1 (D2) is consistent with the transmission wavelength $\lambda_D$ of the transmitter D1 (D2).

Meanwhile, in this example, the wavelengths of the optical signals transmitted from the transmitters A1 to D1 to the receivers A1 to D1 are consistent with the wavelengths of the optical signals transmitted in the reverse direction from the transmitters A2 to D2 to the receivers A2 to D2, respectively, but may be different.

The receiver A1 (A2) extracts and receives a signal of the transmission wavelength $\lambda_A$ of the transmitter A1 (A2) from the WDM optical signal branched and input from the demultiplexer (optical splitter) 15. The receiver B1 (B2) extracts and receives a signal of the transmission wavelength $\lambda_B$ of the transmitter B1 (B2) from the WDM optical signal.

Similarly, the receiver C1 (C2) extracts and receives a signal of the transmission wavelength $\lambda_C$ of the transmitter C1 (C2) from the WDM optical signal. The receiver D1 (D2) extracts and receives a signal of the transmission wavelength $\lambda_D$ of the transmitter D1 (D2) from the WDM optical signal.

However, because adjacent channels are close to the WDM optical signal of the super-channel, a part of signal components of the adjacent channels may be included (or may "remain") in the received signals at the receivers A1 to D1 (A2 to D2).

For example, at the receiver A1 (A2), a part of signal components of the adjacent channel (wavelength $\lambda_B$) may be included in the received signal. At the receiver B1 (B2), a part of signal components of the adjacent channels (wavelengths $\lambda_A$ and $\lambda_C$) may be included in the received signal.

At the receiver C1 (C2), a part of signal components of the adjacent channels (wavelengths $\lambda_B$ and $\lambda_D$) may be included in the received signal. At the receiver D1 (D2), a part of signal components of the adjacent channel (wavelength $\lambda_C$) may be included in the received signal.

For example, the spectrum of the reception signal may include not only the spectrum having, as a center frequency, a frequency corresponding to the wavelength of the local oscillation light source, but also the signal component spectrum of the adjacent channel at one or both of the low frequency side and high frequency side with respect to the spectrum.

Hereinafter, a method for controlling the transmission wavelength of the transmitter in the configuration illustrated in FIG. 7 will be described. For example, it is assumed that when the transmission wavelength of the transmitter B2 is not present at an expected position as compared to the transmission wavelengths of the transmitter A2 and the transmitter C2, the wavelength position is controlled.

The control of the wavelength position may be realized by providing a channel spacing monitor in, for example, an element of the optical network 60 (e.g., NE such as an optical relay node or ROADM) and using the monitoring result.

If the channel spacing of the transmission signal can be monitored by the channel spacing monitor, it is possible to detect the transmission wavelength which is absent at an expected wavelength position. By feeding the detection result back to the corresponding transmitter, it is possible to control the transmission wavelength which is absent at the expected wavelength position to move to the original expected wavelength position.

However, this method requires work and cost to add the channel spacing monitor to the optical network 60. Further, a control signal path for feeding the monitored channel spacing back to the transmitter is added. Thus, the method of monitoring the channel spacing in the optical network 60 has a large influence on the cost, which may be a significant barrier in terms of introducing the method.

Figure 8:
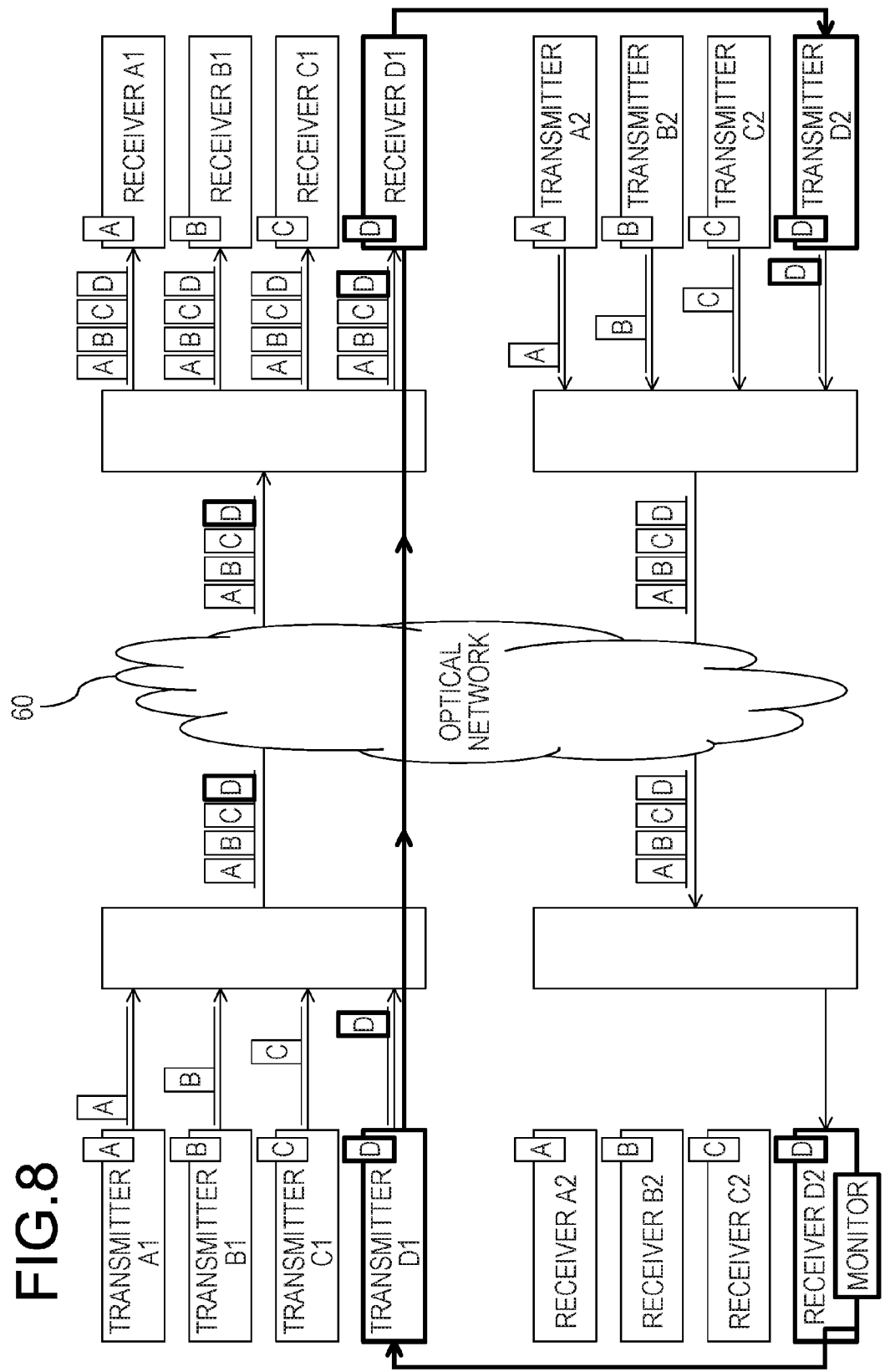
FIG. 8 is a block diagram illustrating an aspect in which the monitoring result of the channel spacing is superimposed on the transmission signal directed to an opposing site as a frequency modulation component in the optical transmission system illustrated in FIG. 7.

In contrast, for example, as illustrated in FIG. 8, if the channel spacing can be monitored by any one of the receivers A2 to D2 (e.g., receiver D2), a shift of the transmission wavelength of the opposing transmitter D2 can be detected (or "measured") by the receiver D2.

Then, for example, if the detection result (or wavelength control information according to the detection result) is notified to the transmitter D2 of the opposing station through the receiver D1 of the opposing station from the transmitter D1, it is possible to minimize the shift of the transmission wavelength of the transmitter D2.

By way of example, the notification may be performed by modulating the frequency of transmission light of the transmitter D1 and superimposing notification information (wavelength shift detection result or wavelength control information) on the transmission light. The notification information may be regarded as an example of the supervisory control information. The transmission light on which the supervisory control information is superimposed may be regarded as light including a supervisory (SV) optical component or an optical supervisory channel (OSC) component.

The receiver D1 demodulates and detects the control notification information superimposed on the reception signal by the frequency modulation. By controlling the transmission wavelength of the transmitter B2 based on the detected notification information, it is possible to compensate the transmission wavelength shift of the transmitter D2. Meanwhile, the transmission wavelength shift of the transmitters other than the transmitter D2 also can be compensated by feeding the monitoring result at the corresponding receiver back to the corresponding transmitter in the same manner as described above.

A set of the receiver D2 and the transmitter D1 may be regarded as being included in one transponder 111 illustrated in FIG. 2. Similarly, a set of the receiver D1 and the transmitter D2 also may be regarded as being included in one transponder 111 illustrated in FIG. 2 of another node.

Thus, the transmission and reception of information between the receiver D2 (D1) and the transmitter D1 (D2) in the same transponder 111 become relatively easy, and the control of the transmission wavelength shift of the transmitter D2 (D1) also can be easily realized. For example, the control of the transmission wavelength shift may be implemented by the controller 114 illustrated in FIG. 2, or a controller (not illustrated in FIG. 2) incorporated in the transponder 111.

Thus, if it is possible to monitor the channel spacing by the receiver, it is possible to realize the wavelength control at low cost without adding a monitor or a control signal path to the optical network 60.

Figure 9:
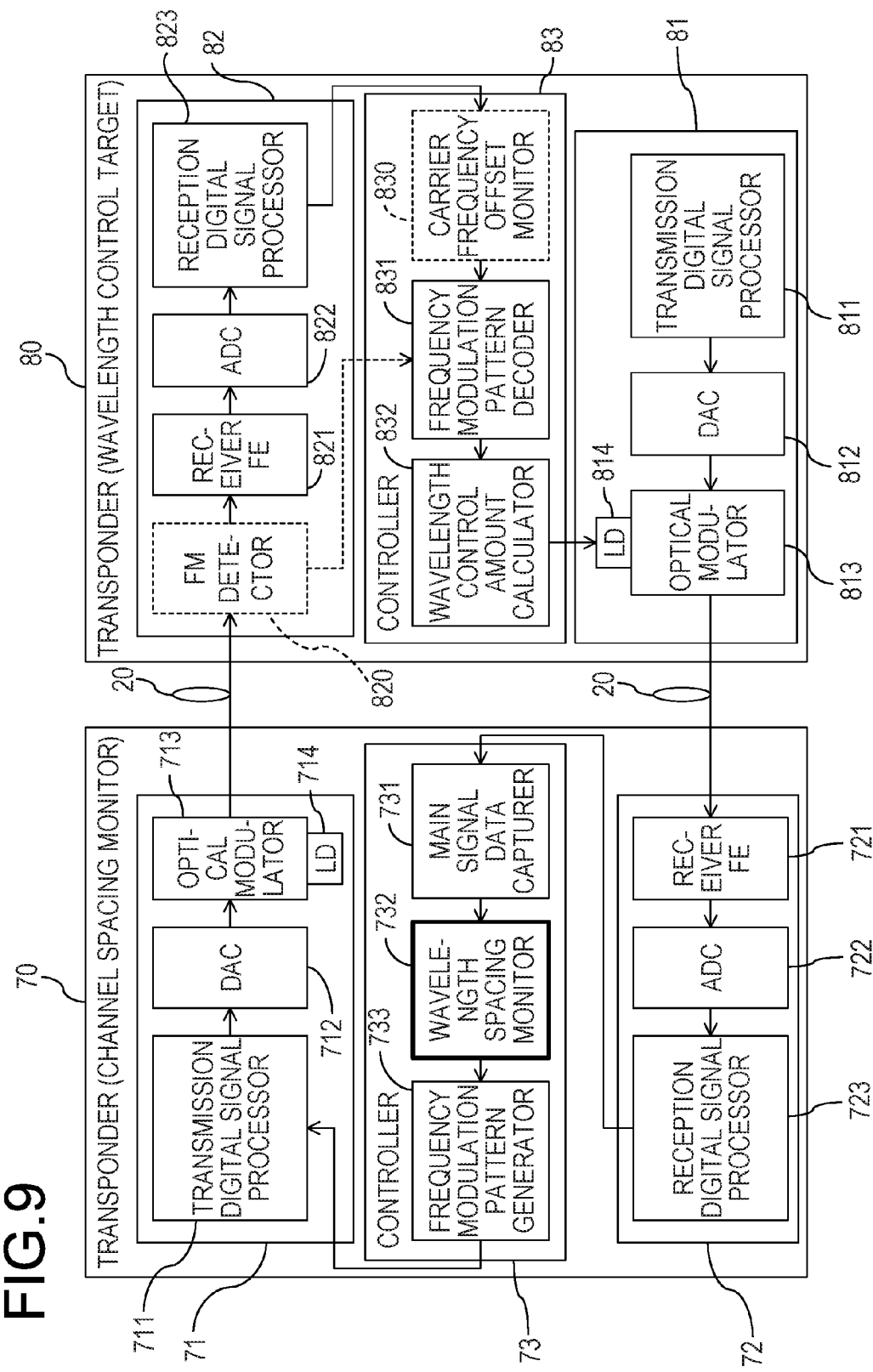
FIG. 9 is a block diagram illustrating an exemplary configuration of a transponder illustrated in FIGS. 1 to 3.

Next, FIG. 9 illustrates an exemplary configuration of the transponder to realize the wavelength control of the transmission light source as described above. The transponders 70 and 80 illustrated in FIG. 9 are connected, for example, via the above described optical transmission line 20 (i.e., the optical network 60) to enable bidirectional optical communication. The transponders 70 and 80 illustrated in FIG. 9 may be regarded as being equivalent to the NB optical transceiver module 1113 illustrated in FIG. 3.

A transponder 70 in one side may correspond to, for example, one of the transponders 111 of FIG. 2 provided in the optical transmission apparatus 10-1 of FIG. 1, and also may be regarded as corresponding to a transponder including the receiver D2 illustrated in FIG. 8. Therefore, the transponder 70 may be regarded as corresponding to a transponder having a function of monitoring the channel spacing described with reference to FIG. 8. Thus, hereinafter, the transponder 70 may be referred to as "monitor transponder 70" for the sake of convenience.

A transponder 80 in the other side may correspond to, for example, one of the transponders 111 of FIG. 2 provided in the optical transmission apparatus 10-2 of FIG. 1, and also may be regarded as corresponding to the transponder 70 including the transmitter D2 illustrated in FIG. 8

Therefore, the transponder 80 may be regarded as corresponding to a transponder whose transmission wavelength is controlled on the basis of the channel spacing monitoring result described with reference to FIG. 8. Thus, hereinafter, the transponder 80 may be referred to as "wavelength control target transponder 80" for the sake of convenience.

The optical transmission apparatus 10-2 provided with the wavelength control target transponder 80 may be regarded as an example of a first optical transmission apparatus for transmitting, as a WDM optical signal, a plurality of transmission signals whose waveform (spectrum) is shaped by using digital signal processing.

In contrast, the optical transmission apparatus 10-1 provided with the monitor transponder 70 may be regarded as an example of a second optical transmission apparatus for receiving the WDM optical signal transmitted from the optical transmission apparatus 10-2 in a digital coherent manner.

The monitor transponder 70 includes, for example, a transmitter 71, a receiver 72, and a controller 73. The transmitter 71 may be regarded as corresponding to the transmitter D1 illustrated in FIG. 8, and the receiver 72 may be regarded as corresponding to the receiver D2 illustrated in FIG. 8.

The transmitter 71 includes, for example, a transmission digital signal processor 711, a Digital to Analogue Converter (DAC) 712, an optical modulator 713, and a transmission light source (e.g., LD) 714.

The transmission digital signal processor 711 performs digital signal processing such as spectrum shaping, carrier frequency control or nonlinear compensation on a transmission digital data signal.

The DAC 712 converts the transmission digital data signal which has been subjected to digital signal processing by the transmission digital signal processor 711 into an analog data signal. The analog data signal obtained by the DAC 712 is provided to the optical modulator 713 as a drive signal of the optical modulator 713.

The optical modulator 713 generates a transmission modulated signal light by modulating the output light of the transmission light source 714 by the drive signal provided from the DAC 712. The transmission modulated signal light is transmitted to the optical transmission line 20 leading to the opposing transponder 80. The transmission light source 714 may be a light source (e.g., tunable LD) whose emission wavelength is variable.

Further, in the carrier frequency control in the transmission digital signal processor 711, by performing the frequency control according to the above-described supervisory control information, it is possible to superimpose the supervisory control information on the transmission modulated signal light as a frequency modulation component.

Meanwhile, the receiver 72 is an example of a receiver for receiving and demodulating the WDM optical signal in a digital coherent manner, and includes, for example, a receiver front-end (FE) 721, an analogue to digital converter (ADC) 722, and a reception digital signal processor 723.

By way of example, the receiver FE 721 includes the aforementioned local oscillation light source, or a photoelectric converter such as an optical phase hybrid and a photo detector (PD). By causing the output light of the local oscillation light source to interfere with the WDM optical signal received from the optical transmission line 20 in the same phase and different phases (e.g., 90-degree different phases) by an optical phase hybrid, it is possible to demodulate the signal light by measuring the electric field complex information of the signal light corresponding to a desired reception channel. The demodulated signal light is photoelectrically converted into an analog electrical signal by, for example, a PD and input to the ADC 722. The receiver FE 721 may be paraphrased as "receiver 721".

The ADC 722 converts the analog electrical signal of the signal light demodulated in the receiver FE 721 into a digital electrical signal and inputs the digital electrical signal to the reception digital signal processor 723. The analog electrical signal input from the receiver FE 721 may be sampled at the ADC 722, for example, two or more times per symbol. By this sampling, the analog waveform information including the phase information is quantized into a digital value. By converting the analog waveform information into digital values, it is possible to implement various characteristic compensations by the calculation processing of digital values.

The reception digital signal processor 723 performs a digital signal processing on the digital electrical signal corresponding to the signal light demodulated by the receiver FE 721. The digital signal processing may include, for example, a dispersion compensation, a sampling phase synchronization, an adaptive equalization, a frequency offset compensation, a carrier phase reconstruction and the like. The reception digital signal processor 723 can be realized by using, for example, a Digital Signal Processor (DSP), a Field Programmable Gate Array (FPGA), a large-scale integrated circuit (LSI) or the like.

Figure 10:
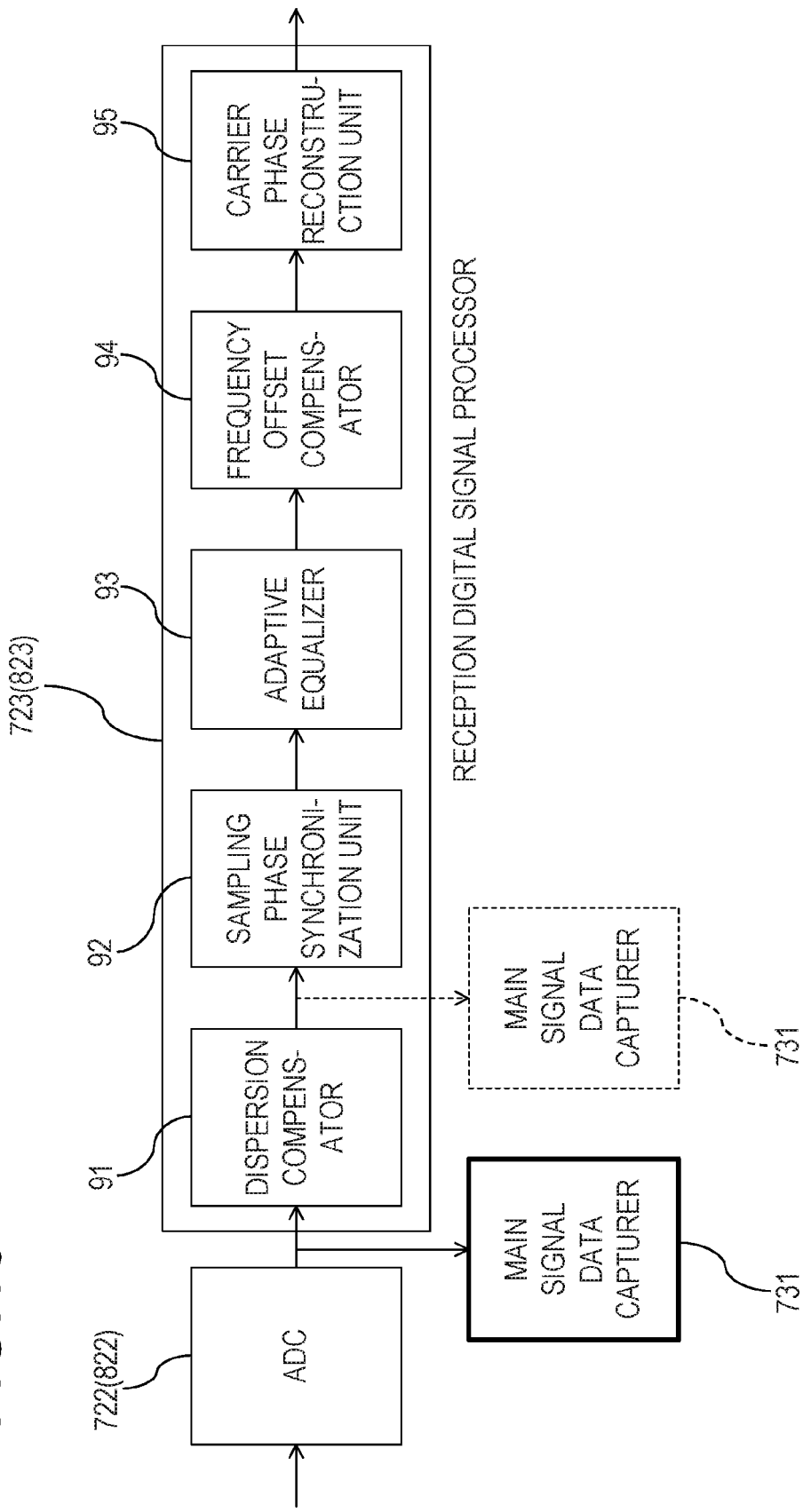
FIG. 10 is a block diagram illustrating an exemplary configuration of a reception digital signal processor illustrated in FIG. 9.

As a specific example, the reception digital signal processor 723 may include, for example, as illustrated in FIG. 10, a dispersion compensator 91, a sampling phase synchronization unit 92, an adaptive equalizer 93, a frequency offset compensator 94, and a carrier phase reconstruction unit 95. A reception digital signal processor 823 of the transponder 80 also may be identical or similar to the configuration of FIG. 10.

The dispersion compensator 91 performs a wavelength dispersion processing by using a digital filter that models waveform distortion due to wavelength dispersion in a transversal filter or the like with respect to the digital electrical signal input from the ADC 722.

The sampling phase synchronization unit 92 performs processing for optimizing the timing (frequency and phase) of sampling in the ADC 722 (e.g., for synchronizing the timing with the center of a data pulse).

The adaptive equalizer 93 includes, for example, a plurality of linear filters, and adaptively equalizes (compensates) the waveform distortion due to polarization fluctuation or polarization mode dispersion (PMD) by adaptively updating parameters of each filter at a sufficiently higher speed than the polarization fluctuation of the signal light. The equalization process may be performed, for example, at a symbol rate.

The frequency offset compensator 94 compensates (corrects) a frequency offset between the received signal light and the output light of the local oscillation light source. The estimation of the frequency offset may be performed by applying, for example, an estimation method called exponentiation, or an estimation method called a pre-decision based angle differential frequency offset estimator (PADE) method capable of enlarging an estimation range of the frequency offset compared to exponentiation.

The carrier phase reconstruction unit 95 estimates a correct carrier phase by removing a noise component from the received digital signal whose frequency offset is compensated by the frequency offset compensator 94, and synchronizes the phase of the received digital signal with the estimated carrier phase. The estimation of the carrier phase may be performed by applying, for example, a feedback method of eliminating the effects of noise by using a digital loop filter, or a feed forward method of eliminating the effects of noise by averaging estimated phase differences detected by the phase detector.

The carrier phase reconstruction unit 95 monitors a signal in the middle of demodulation, and may be utilized to perform the analysis of a transmission quality status by using the monitored signal. Further, the carrier phase reconstruction unit 95 may be used to detect supervisory control signal light superimposed on the transmitted signal light in order to perform the monitoring control with the opposing station.

The dispersion compensator 91, the sampling phase synchronization unit 92, the adaptive equalizer 93, the frequency offset compensator 94 and the carrier phase reconstruction unit 95 may be implemented by, for example, a computing device, such as a DSP, having computing capabilities. The computing device may be referred to as a "processor device" or "processor circuit."

Subsequently, returning to FIG. 9, the controller 73 controls the operations of the transmitter 71 and the receiver 72 as described above. Further, the controller 73 monitors the channel spacing based on the received digital signal obtained by the receiver 72, and superimposes the monitoring result (or wavelength control information based on the monitoring result) on the transmission signal of the transmitter 71.

Therefore, the controller 73 includes, for example, a main signal data capturer 731, a wavelength spacing monitor 732, and a frequency modulation pattern generator 733.

The main signal data capturer 731, for example, as illustrated in FIG. 10, obtains (captures) main signal data having a data length sufficient to monitor the channel spacing from the output of the ADC 722. The capturing position of the main signal data may be the output of the dispersion compensator 91 (the input of the sampling phase synchronization unit 92).

If the dispersion compensation by the dispersion compensator 91 is fully functional to obtain stable main signal data, the improvement of accuracy in monitoring the channel spacing can be expected. As the capturing position of the main signal data, the output of the adaptive equalizer 93, the output of the carrier phase reconstruction unit 95 or the like can be also considered.

However, in the case of these outputs, the rate of the received data signal is being reduced to the symbol rate (i.e., down-sampled). Accordingly, the signal component of the adjacent channel observable according to the oversampling may not be sufficiently observed.

In other words, the capturing position of the main signal data is not limited to the output of the ADC 722 or the output of the dispersion compensator 91 if the data signal has a rate at which the signal component of the adjacent channel is sufficiently observable.

The wavelength spacing monitor 732 obtains the channel spacing by analyzing the main signal data (hereinafter referred to as "capture data") captured by the main signal data capturer 731. For example, the wavelength spacing monitor 732 converts the capture data from data in a time domain to data in a frequency domain (i.e., frequency spectrum signal) by performing a Fast Fourier Transform (FFT) operation on the capture data. Instead of the FFT operation, a Discrete Fourier Transform (DFT) operation may be used.

When the channel spacing is narrow as in the super-channel, the frequency spectrum signal (hereinafter, simply referred to as "spectrum signal") obtained by the FFT operation may contain a part of the spectrum of the adjacent channel. For example, a part of the spectrum of the adjacent channel may appear on the high frequency side with respect to the frequency (e.g., about 18 GHz) at which a drop of the power is maximized.

The wavelength spacing monitor 732 measures the width of a gap between channels based on the frequency spectrum, and determines a wavelength control amount of the transmission wavelength of the transmitter 81 of the opposing transponder 80 based on the measurement result.

As an example of a method of measuring the width of a gap between channels, there is a method of setting a determination threshold value on a longitudinal axis (power) of the spectrum, and determining a section in which the power of the spectrum is below the determination threshold value as the gap width.

Referring back to FIG. 9, the frequency modulation pattern generator 733 incorporates information (hereinafter sometimes referred to as "wavelength control information") indicating the wavelength control amount determined by the wavelength spacing monitor 732 into a pattern of frequency modulation represented by two values such as "1" or "0."

The pattern of frequency modulation (hereinafter sometimes referred to as a "frequency modulation pattern") is provided to the transmission digital signal processor 711 of the transmitter 71. The transmission digital signal processor 711 performs frequency modulation on the transmission digital data signal according to the frequency modulation pattern.

Thus, the wavelength control information is superimposed as an example of the supervisory control information on the transmission modulated signal light to the opposing transponder 80. Thus, the transmitter 71 may be considered as an example of a transmitter which transmits the wavelength control information according to the monitoring result of the wavelength spacing monitor 732 to the transponder 80.

Meanwhile, the superimposition of the wavelength control information may be realized, for example, by controlling the carrier frequency of a signal obtained by spectrum shaping of the transmission digital data signal by digital signal processing in the transmission digital signal processor 711.

Figure 11:
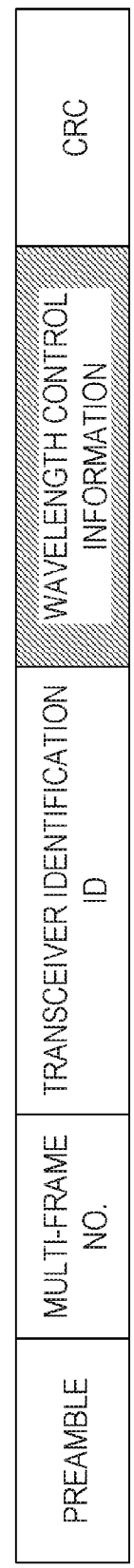
FIG. 11 is a diagram illustrating a format example of a frequency modulation pattern frame to be superimposed on the transmission signal in the optical transmission system illustrated in FIG. 9.

FIG. 11 illustrates an example of a frame format of the frequency modulation pattern. The wavelength control information is mapped to a frame (hereinafter sometimes referred to as a "frequency modulation pattern frame") as illustrated in FIG. 11.

At the start of the frame, a preamble which is an example of a known signal between the transponders 70 and 80 may be assigned. The reception-side transponder 80 can identify the start of the frame by detecting the preamble.

At the end of the frame, an error detection code such as cyclic redundancy check (CRC) may be assigned. On the reception side, it is possible to confirm the validity of the received frame by using the error detection code.

Also, for example, information (which may be referred to as "transceiver identification ID") that enables identification of a pair of the transmitter and the receiver to be wavelength controlled by the wavelength control information may be mapped to the frequency modulation pattern frame.

If the transceiver identification ID or the wavelength control information is not accommodated in one frame, the transceiver identification ID or the wavelength control information may be divided and transmitted in multiple frames. In the case of multi-frame transmission, a multi-frame number may be assigned to the frequency modulation pattern frame.

In this example, the wavelength control information according to the monitoring result of the wavelength spacing monitor 732 is superimposed on the transmission modulated signal light to the transponder 80, but the monitoring result itself may be superimposed on the transmission modulated signal light to the transponder 80 as a 'wavelength spacing information'.

In the transponder 80, the wavelength control information may be determined from the received monitoring result. In other words, the wavelength control information may be determined by any of the monitor side and the wavelength control target side.

Next, an exemplary configuration of the (wavelength control target) transponder 80 illustrated in FIG. 9 will be described. The wavelength control target transponder 80 illustrated in FIG. 9 includes, for example, a transmitter 81, a receiver 82, and a controller 83.

The transmitter 81 includes, for example, a transmission digital signal processor 811, a DAC 812, an optical modulator 813, and a transmission light source (e.g., LD) 814.

The transmission digital signal processor 811, the DAC 812 and the optical modulator 813 may be identical or similar to the transmission digital signal processor 711, the DAC 712 and the optical modulator 713, respectively, in the transponder 70.

For example, the transmission digital signal processor 811 performs digital signal processing such as waveform (spectrum) shaping, carrier frequency control or nonlinear compensation on a transmission digital data signal.

The DAC 812 converts the transmission digital data signal which has been subjected to digital signal processing by the transmission digital signal processor 811 into an analog data signal. The analog data signal obtained by the DAC 812 is provided to the optical modulator 813 as a drive signal of the optical modulator 813.

The optical modulator 813 generates a transmission modulated signal light by modulating the output light of the transmission light source 814 by the drive signal provided from the DAC 812. The transmission modulated signal light is transmitted to the optical transmission line 20 leading to the opposing transponder 70. Similarly to the transmission light source 714, the transmission light source 814 may be a light source (e.g., tunable LD) whose emission wavelength is variable.

Although not illustrated in FIG. 9, also in the transmitter 81, similarly to the transmitter 71 of the transponder 70, the supervisory control information may be superimposed as a frequency modulation component on the transmission modulated signal light by the transmission digital signal processor 811.

The receiver 82 includes, for example, a receiver FE 821, an ADC 822, and a reception digital signal processor 823. The receiver FE 821, the ADC 822 and the reception digital signal processor 823 may be identical or similar to the receiver FE 721, the ADC 722, and the reception digital signal processor 723 in the receiver 72 of the transponder 70.

Optionally, the receiver 82 may include a frequency modulation (FM) detector 820, for example, at a front stage of the receiver FE 821. The FM detector 820 FM detects a superimposed signal by receiving the signal light on which the wavelength control information is superimposed by frequency modulation in the transmitter 71 of the opposing transponder 70 as described above. The detection signal is provided to, for example, the controller 83 (frequency modulation pattern decoder 831 to be described later).

The controller 83 includes, for example, the frequency modulation pattern decoder 831 and a wavelength control amount calculator 832.

The frequency modulation pattern decoder 831 decodes the frequency modulation pattern superimposed on the signal light received by the receiver 82. If the FM detector 820 is provided in the receiver 82 as described above, the frequency modulation pattern decoder 831 decodes the frequency modulation pattern from the FM detection signal.

If the FM detector 820 is not provided in the receiver 82, the controller 83 may include a carrier frequency offset monitor 830.

The carrier frequency offset monitor 830 obtains a signal equivalent to the detection signal obtained by the FM detector 820 by performing processing equivalent to FM detection on a reception digital data signal which has been subjected to digital signal processing by the reception digital signal processor 823.

For example, it may be possible to obtain an FM detection signal in a process of estimating the frequency offset by the frequency offset compensator 94 (see, FIG. 10).

In this case, the frequency modulation pattern decoder 831 decodes the frequency modulation pattern represented by two values such as "1" or "0" from the FM detection signal obtained by the carrier frequency offset monitor 830.

The wavelength control amount calculator 832 calculates and determines the wavelength control amount based on the wavelength control information indicated by the frequency modulation pattern decoded by the frequency modulation pattern decoder 831, and controls the emission wavelength of the transmission light source 814 of the transmitter 81 according to the wavelength control amount.

The control of the emission wavelength may be performed in stages. For example, if the wavelength control amount is greater than a predetermined threshold value, the control amount may be adjusted such that after dividing the wavelength control amount into several times, the emission wavelength is shifted slightly by the divided amount.

Alternatively, if a delay is included in the feedback loop until adjusting the emission wavelength after monitoring the channel spacing, the one-time control amount may be adjusted for stable leading-in. Alternatively, if a random error is included in the wavelength control amount, it is possible to reduce the error by averaging the multiple control amounts. The control amount may be adjusted for such a purpose.

Meanwhile, the monitoring function including the controller 73 in the above-described transponder 70 may be also provided in the opposing transponder 80 (e.g., controller 83). Similarly, the transmission wavelength control function including the controller 83 in the transponder 80 may be also provided in the transponder 70 (e.g., controller 73). In other words, each of the transponders 70 and 80 may function as both a monitor transponder and a wavelength control target transponder.

Further, the "channel spacing" usually means a distance between the center wavelength of one channel and the center wavelength of the adjacent channel. However, as illustrated in FIG. 4B, in the super-channel, since the spectrum of each channel is shaped in a rectangular shape, the width of the spectrum may be considered to be equivalent to the width of the rectangle.

Figure 12:
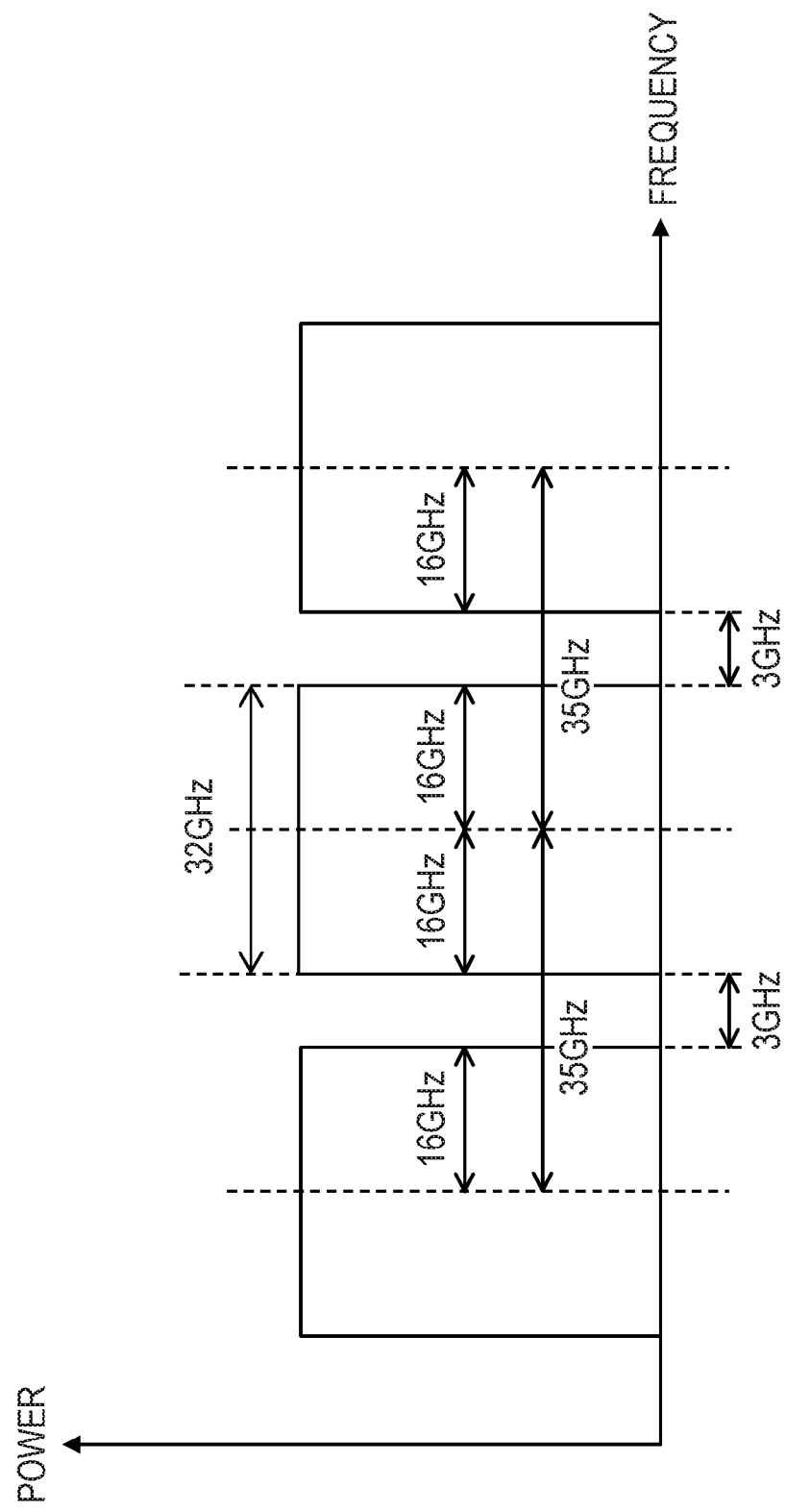
FIG. 12 is a diagram illustrating an example of a channel arrangement of the super-channel signal which is spectrally shaped into a rectangular shape in a transmission digital signal processor illustrated in FIG. 9.

For example, as schematically illustrated in FIG. 12, the width of the spectrum may be considered as 32 GHz in full width of the rectangle and 16 GHz in half width of the rectangle. Therefore, if the width of the gap between channels is measurable, the gap width can be converted into the channel spacing by calculation of "gap width (e.g., 3 GHz)+ spectrum full width (e.g., 32 GHz)=channel spacing (e.g., 35 GHz)."

[Example of the Transmission Wavelength Control]

Next, a description will be made of an example of the transmission wavelength control in the wavelength control target transponder 80 that has received the wavelength control information according to the wavelength control amount determined by the wavelength spacing monitor 732.

As described with reference to FIG. 9, in the wavelength control target transponder 80, the frequency modulation pattern decoder 831 of the controller 83 decodes the frequency modulation pattern superimposed as a frequency modulation component on the signal light received by the receiver 82.

The frequency modulation component includes, for example, two types of periodically varying frequency offset values "+Δf" and "−Δf." By using equations "+Δf"="1" and "−Δf"="0," it is possible to represent the frequency modulation pattern of two values of "1" or "0." Thus, for example, in the carrier frequency offset monitor 830 (see, e.g., FIG. 9), by detecting two types of frequency offset values through detection, it is possible to restore the frequency modulation pattern including the wavelength control information.

The frequency modulation pattern decoder 831 detects a frame start position by detecting a preamble from the restored frequency modulation pattern (frame, see, e.g., FIG. 11). Further, the frequency modulation pattern decoder 831 extracts the number of bits corresponding to the frame length from the detected frame start position, and performs the computation of the error detection using the CRC at the end of the frame.

As a result of the error detection, if it is determined that there is an error, the frequency modulation pattern decoder 831 discards the corresponding frame. If it is determined that there is no error, the frequency modulation pattern decoder 831 extracts the wavelength control information mapped to the frame and provides the wavelength control information to the wavelength control amount calculator 832.

The wavelength control amount calculator 832 controls the emission wavelength of the transmission light source 814 in the transmitter 81 according to the wavelength control amount indicated by the wavelength control information provided from the frequency modulation pattern decoder 831. Meanwhile, for example, in a case where the wavelength control amount is greater than a predetermined threshold value, the wavelength control amount calculator 832 may adjust the control amount such that after dividing the wavelength control amount into plural amounts, the emission wavelength of the transmission light source 814 is shifted by the divided amount.

The wavelength control amount calculator 832 controls the emission wavelength of the transmission light source 814 such that the channel spacing between adjacent channels is constant. However, the wavelength control amount calculator 832 may set one of channels as a reference channel whose wavelength is not controlled without controlling all of a plurality of channels which are wavelength-multiplexed, and may control the wavelengths of the other channels based on the reference channel.

As described above, the channel spacing of the super-channel can be monitored easily, at the reception-side transponder 70, without using an expensive measuring instrument such as a spectrum analyzer. Therefore, since it is not necessary to provide the monitor in the optical network 60, it is possible to suppress an increase in work and cost.

Further, by superimposing the wavelength control information according to the monitoring result on the modulated signal light transmitted from the reception-side transponder 70 to the transmission-side transponder 80, it is possible to control the emission wavelength of the transmission light source 814. Therefore, it is not necessary to additionally install the control signal path for the feedback.

Consequently, since the wavelength control of the transmission light source 814 can be realized at low cost, it is possible to make the channel spacing narrow independent of the wavelength fluctuation of the transmission light source 814. Thus, as illustrated in Table 1, it is possible to improve the transmission quality by ensuring the outer peripheral margin and improve the utilization efficiency of frequency bands.

Meanwhile, similarly to the controller 114 described above, one or both of the controller 73 of the transponder 70 and the controller 83 of the transponder 80 may be implemented by using a processor device such as a CPU or DSP having computing capabilities and a storage device such as a memory. By allowing the processor device to operate by appropriately reading data or a program (may be referred to as "software") corresponding to the control stored in the storage device, the function as the controller 73 or the controller 83 may be embodied. Similarly to the controller 114, one or both of the controllers 73 and 83 may be implemented by using an ASIC or FPGA or the like.

As described above, by monitoring the channel spacing of the WDM signal light in the operation of the optical transmission system 1, it is determined whether the channel spacing between adjacent channels is appropriate. If it is determined to be not appropriate, it is possible to perform the wavelength control such that the channel spacing is appropriate.

However, due to the influence of the transmission path characteristics more deteriorated than expected and the deterioration or failure of the apparatus, the adjacent channel spacing may not be accurately detected at the receiving station (monitor transponder 70). Therefore, there may be a case where the transmission wavelength is controlled such that the channel spacing is excessively wide.

It is assumed that the transmission wavelength to be controlled is, for example, a wavelength that is adjacent to the outer edge of the transmission band of the multiplexer 12 or the demultiplexer 15. In this case, there is a possibility that the transmission wavelength is shifted to the wavelength position of an insufficient margin from the outer edge of the transmission band by the wavelength control.

Figure 13A:
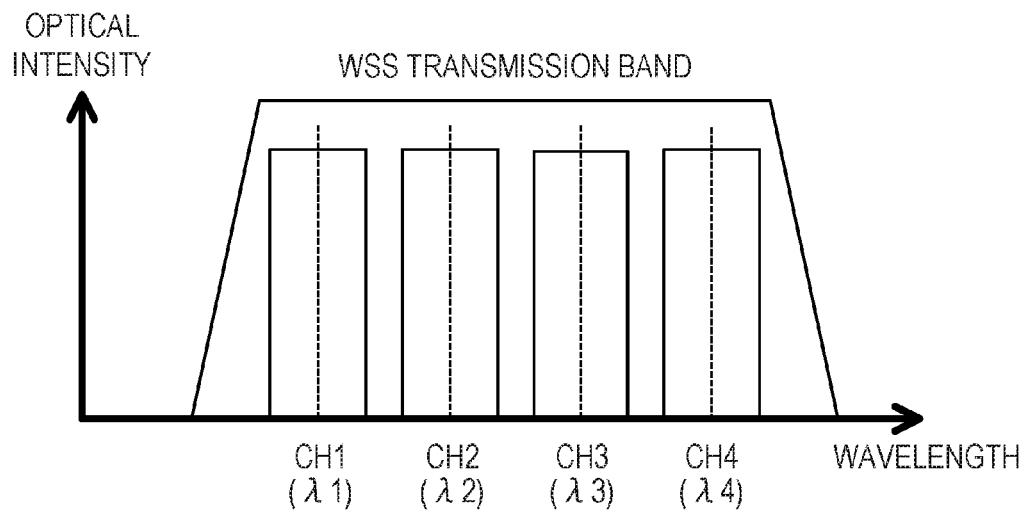
FIG. 13A is a diagram schematically illustrating an example of a signal light spectrum of four wavelengths which is set in a transmission band of wavelength selection switch (WSS)
Figure 13B:
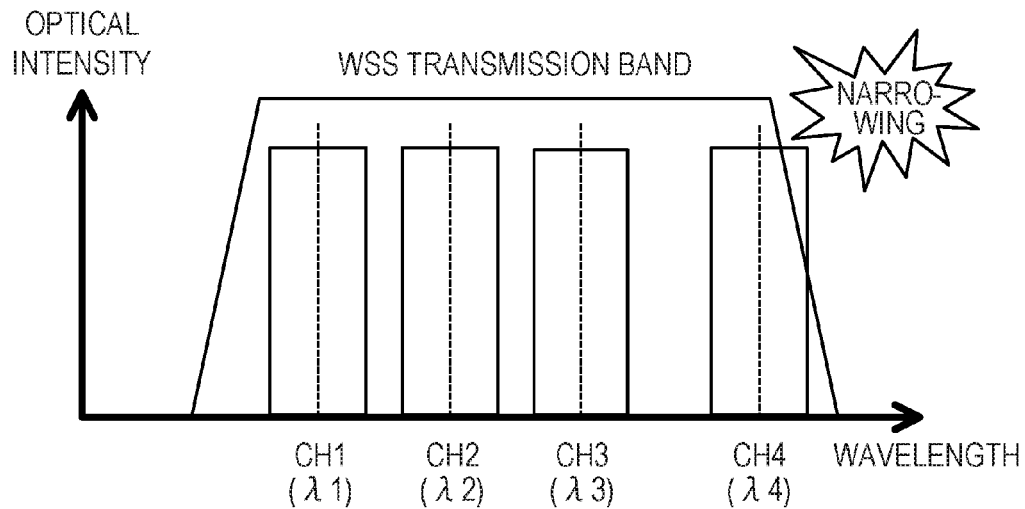
FIG. 13B is a diagram schematically illustrating a state in which a part of the signal light spectrum of the longest wavelength is cut by attenuation characteristics of an outer edge of a WSS transmission band.

For example, as illustrated in FIG. 13B, it is assumed that the channel CH4 adjacent to the outer edge on the long wavelength side of the wavelength transmission band of the multiplexer 12 (or demultiplexer 15) has been wavelength shifted to the longer wavelength side by the wavelength control. Meanwhile, the multiplexer 12 or the demultiplexer 15 may be configured using WSS, in which case the wavelength transmission band of the multiplexer 12 (or demultiplexer 15) may be regarded as dominantly including (or being substantially equivalent to) the wavelength transmission band of WSS. Therefore, the wavelength transmission band of the multiplexer 12 (or demultiplexer 15) may be referred to as "WSS transmission band" for convenience.

As a result of the wavelength shift of the channel CH4, unless a sufficient margin is ensured between the channel CH4 and the outer edge of the WSS transmission band, a part of the signal light spectrum in the channel CH4 is cut by the attenuation characteristics of the WSS transmission band. In this way, cutting a part of the signal light spectrum may be referred to as "spectral narrowing."

When the spectral narrowing occurs, the reception characteristics of the signal light are deteriorated. In the worst case, synchronization of the reception signal cannot be maintained at the receiving station, which may cause a signal interruption. Meanwhile, FIG. 13A illustrates a state where the transmission wavelength of each of the channels CH1 to CH4 is set and controlled to an appropriate wavelength position such that a spectral narrowing does not occur within the WSS transmission band.

In embodiments to be described below, descriptions will be made on a method for suppressing or avoiding the occurrence of the spectral narrowing caused by the attenuation characteristics of the WSS transmission band as described above.

In summary, during the operation of the optical transmission system 1 or in the wavelength control using the channel spacing monitor described above, it is determined whether the channel adjacent to the outer edge of the WSS transmission band approaches the outer edge or passes over the outer edge.

Then, based on the determination result, a feedback is performed such that the wavelength control is stopped or becomes appropriate. The channel adjacent to the outer edge of the WSS transmission band may be referred to as "an outer edge channel" for convenience.

For example, in FIG. 8, by the transmission wavelength shift of the transmitter D2 corresponding to the outer edge channel, it is detected by the receiver D2 of the opposing station that the transmission wavelength of the transmitter D2 has approached the outer edge of the WSS transmission band, and the detected information may be notified (may be referred to as "fed back") to the opposing station.

The feedback of the information detected by the receiver D2 may be performed by superposing information on the main signal light by frequency modulation as described above. In FIG. 8, by way of illustration, the information detected by the receiver D2 is provided to the transmitter D1 of the opposing station, and is superimposed by frequency modulation on the main signal light to be transmitted from the transmitter D1 to the opposing station.

The main signal light transmitted by the transmitter D1 is received by the receiver D1 of the opposing station, and the information superimposed on the main signal light is detected by the receiver D1. The information detected by the receiver D1 is provided to the transmitter D2.

Thus, the transmitter D2 can stop controlling the transmission wavelength to further approach the outer edge of the WSS transmission band, or shift the transmission wavelength in a direction away from the outer edge of the WSS transmission band.

At the receiver D2, whether the outer edge channel approaches the outer edge or passes over the outer edge of the WSS transmission band can be detected or determined, for example, by using a change in the phase detection sensitivity at the sampling phase synchronization unit 92 (see FIG. 10).

For example, when the signal light spectrum is subject to a band restriction by the attenuation characteristics of the WSS transmission band, the frequency component of the signal light is cut. As a result, the detection sensitivity of the phase (hereinafter referred to as "phase detection sensitivity") required to synchronize the signal phase with the sampling phase at the sampling phase synchronization unit 92 tends to decrease.

Therefore, by monitoring the phase detection sensitivity in the sampling phase synchronization unit 92, and stopping the wavelength control or controlling the wavelength shift amount or wavelength shift direction based on the monitoring result, it is possible to suppress or prevent the deterioration of the reception characteristics of the signal light. Therefore, the occurrence of the signal interruption can be prevented by the band restriction by the attenuation characteristics of the WSS transmission band.

First Embodiment

FIG. 14 is a block diagram illustrating an exemplary configuration of a transponder according to a first embodiment, and is a diagram corresponding to FIG. 9. The transponder (monitor transponder) 70 illustrated in FIG. 14 is different from the configuration of FIG. 9 in that an outer edge approach analyzer 734 is provided in the controller 73. Meanwhile, in the transponder 70 of FIG. 14, the receiver 72 may be regarded as corresponding to the receiver D2 of FIG. 8, and the transmitter 71 may be regarded as corresponding to the transmitter D1 of FIG. 8.

Figure 15:
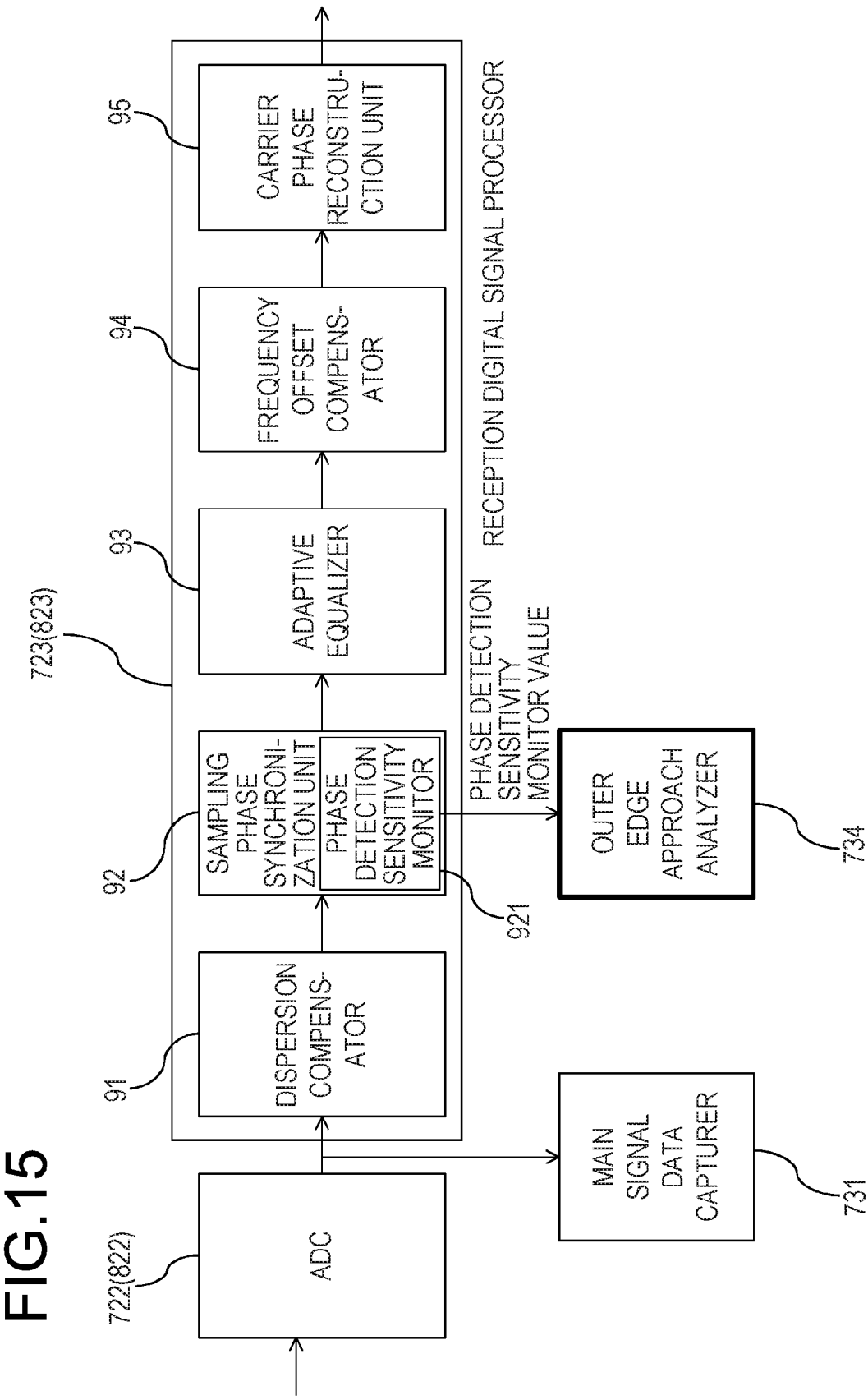
FIG. 15 is a block diagram illustrating an exemplary configuration of a reception digital signal processor illustrated in FIG. 14.

The outer edge approach analyzer 734 receives a phase detection sensitivity monitor value monitored by a phase detection sensitivity monitor 921, which will be described later with reference to FIG. 15, provided in the sampling phase synchronization unit 92 of the reception digital signal processor 723.

Based on the received phase detection sensitivity monitor value, the outer edge approach analyzer 734 may detect that the outer edge channel has approached the outer edge of the WSS transmission band, or analyze and determine whether the outer edge channel passes over the outer edge of the WSS transmission band.

The detection result or the analysis (determination) result (which may be collectively referred to as "outer edge approach information") by the outer edge approach analyzer 734, for example, may be provided to a frequency modulation pattern generator 733. The frequency modulation pattern generator 733 incorporates the outer edge approach information into a frequency modulation pattern represented by two values such as "1" or "0."

The frequency modulation pattern is provided to the transmission digital signal processor 711 of the transmitter 71. The transmission digital signal processor 711 performs frequency modulation on the transmission digital data signal according to the frequency modulation pattern.

Thus, the outer edge approach information is superimposed as an example of the supervisory control information on the transmission modulated signal light to the opposing transponder 80. Thus, the transmitter 71 may be considered as an example of a transmitter which transmits the outer edge approach information obtained by the outer edge approach analyzer 734 to the transponder 80 of the opposing station.

The outer edge approach information superimposed on the transmission modulated signal light to the transponder 80 is decoded by a frequency modulation pattern decoder 831 in the controller 83 of the transponder 80. For example, the frequency modulation pattern decoder 831 detects the outer edge approach information by decoding the frequency modulation pattern from an FM detection signal obtained by an FM detector 820, or from a signal, equivalent to the FM detection signal, obtained by a carrier frequency offset monitor 830.

The detected outer edge approach information is provided to a wavelength control amount calculator 832. The wavelength control amount calculator 832 controls the wavelength of light emitted from a transmission light source 814 of the transmitter 81 based on the outer edge approach information. For example, the wavelength control amount calculator 832 may stop the wavelength control by setting the wavelength shift amount of the transmission light source 814 as "0" if the outer edge approach information indicates the fact that the spectral narrowing occurs when the wavelength of the transmission light source 814 is shifted in a direction approaching the outer edge of the WSS transmission band than the present state.

Alternatively, the wavelength control amount calculator 832 may shift the wavelength of the transmission light source 814 in a direction away from the outer edge of the WSS transmission band (i.e., toward the center of the WSS transmission band). The wavelength shift control in the direction toward the center of the WSS transmission band may be performed continuously in stages until the phase detection sensitivity of the sampling phase synchronization unit 92 is improved to a sensitivity at which a phase synchronization established state can be maintained.

Next, FIG. 15 illustrates an exemplary configuration of the reception digital signal processor 723 (or 823) of the first embodiment illustrated in FIG. 14. The reception digital signal processor 723 illustrated in FIG. 15 is different from the configuration illustrated in FIG. 10 in that the phase detection sensitivity monitor 921 is provided in the sampling phase synchronization unit 92.

The phase detection sensitivity monitor 921 monitors the phase detection sensitivity for synchronizing the signal light phase with the sampling phase at the sampling phase synchronization unit 92.

Figure 16:
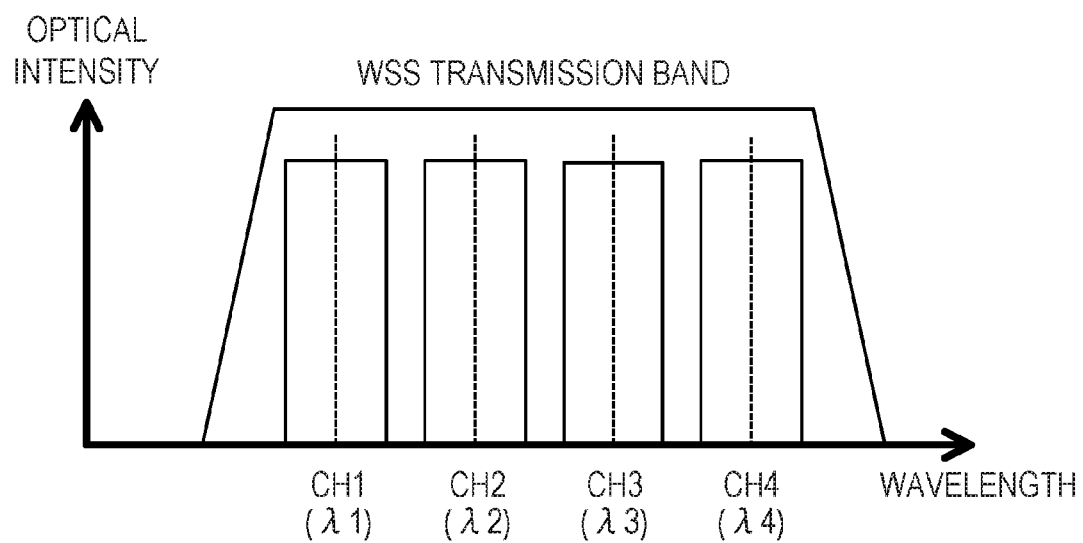
FIG. 16 is a diagram schematically illustrating an example of a signal light spectrum of four wavelengths which is set in the WSS transmission band.
Figure 17:
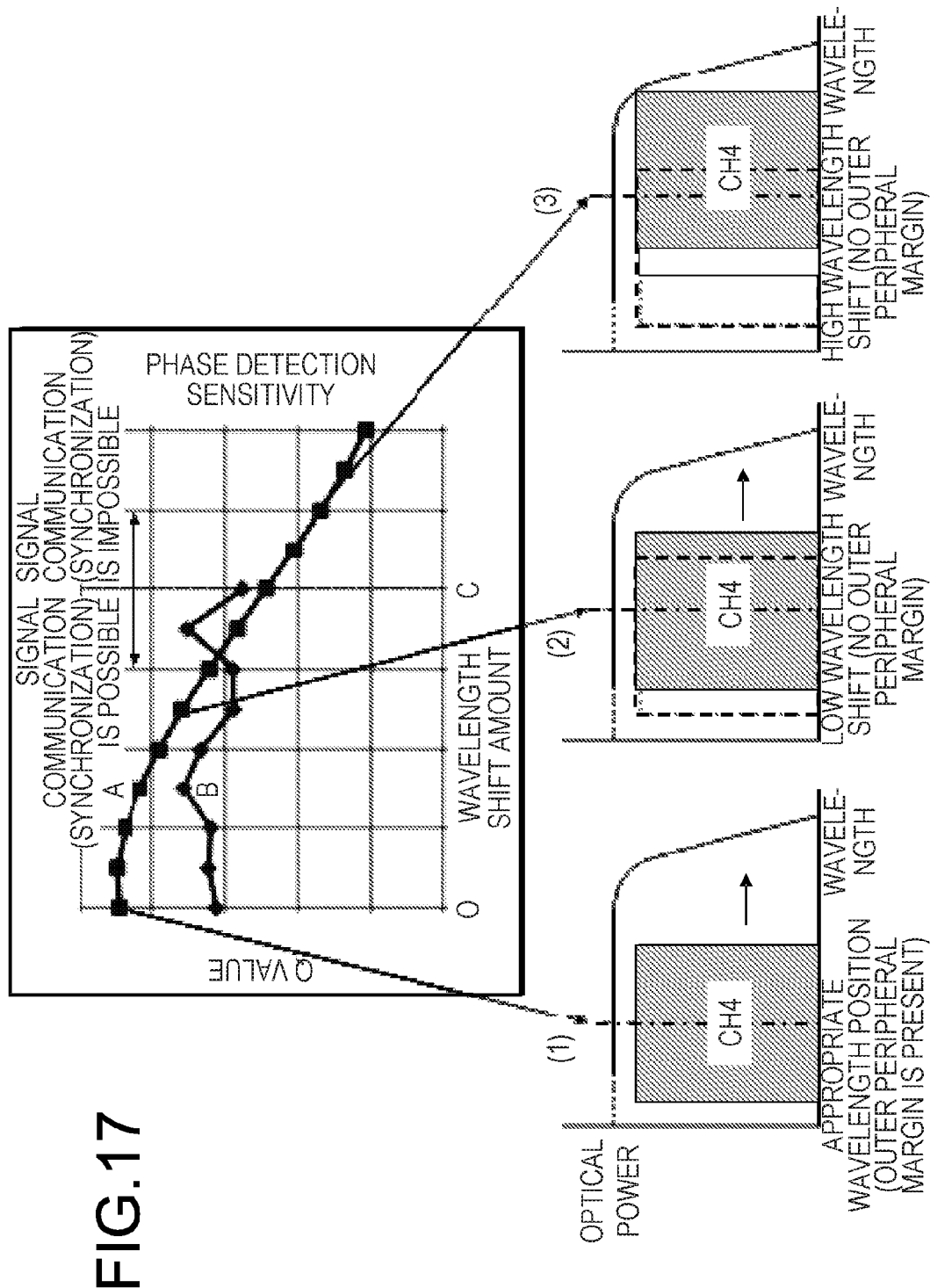
FIG. 17 is a diagram explaining a state where the phase detection sensitivity in the sampling phase synchronization unit illustrated in FIG. 15 is reduced as the signal light wavelength approaches the outer edge of the WSS transmission band.

FIG. 17 illustrates an example of phase detection sensitivity characteristics when one super-channel includes four channels (sub-channels) CH1 to CH4 as illustrated in FIG. 16. The number of sub-channels forming a super-channel may be two or more channels without being limited to four channels.

FIG. 17 illustrates an example of phase detection sensitivity characteristics when the outer edge channel CH4 located on the longest wavelength side in the WSS transmission band among the four channels CH1 to CH4 approaches the outer edge on the long wavelength side of the WSS transmission band by the wavelength control.

In FIG. 17, (1) schematically illustrates a state where the outer edge channel CH4 is located at the appropriate wavelength position and a sufficient outer peripheral margin is ensured in the WSS transmission band.

Further, (2) of FIG. 17 schematically illustrates a state where the outer edge channel CH4 is shifted to the long wavelength side from the appropriate wavelength position by the wavelength control, and the outer peripheral margin has disappeared (i.e., has reached a limit value of the outer peripheral margin).

Further, (3) of FIG. 17 schematically illustrates a state where the outer edge channel CH4 is further shifted to the long wavelength side by the wavelength control, and has reached the wavelength position beyond the limit value of the outer peripheral margin.

In the graph illustrated in FIG. 17, a horizontal axis represents the wavelength shift amount (or frequency shift amount) from the appropriate wavelength position of the channel CH4. Further, a right vertical axis represents the phase detection sensitivity with respect to the wavelength shift amount, and a left vertical axis represents a Q value with respect to the wavelength shift amount.

In FIG. 17, a graph (characteristics) indicated by A represents the characteristics of the phase detection sensitivity with respect to the wavelength shift amount, and a graph (characteristics) indicated by B represents the characteristics of the Q value with respect to the wavelength shift amount.

Also, C represents the wavelength shift amount at which synchronization between the sampling phase and the signal light phase for the outer edge channel CH4 can be maintained (i.e., wavelength shift amount at which the outer edge channel CH4 can perform signal communication). The wavelength shift amount may be referred to as "a critical wavelength shift amount" or "a threshold wavelength shift amount" for convenience.

When the outer edge channel CH4 is wavelength-shifted in a direction approaching the outer edge of the WSS transmission band beyond the critical wavelength shift amount, in the sampling phase synchronization unit 92, synchronization between the signal light phase and the sampling phase cannot be maintained, which leads to a signal interruption of the outer edge channel CH4.

As can be easily understood from the phase detection sensitivity characteristics A of FIG. 17 and (1)-(3) of FIG. 17, the phase detection sensitivity tends to decrease as the outer edge channel CH4 approaches the outer edge of the WSS transmission band from the appropriate wavelength position (i.e., as the wavelength shift amount increases).

For example, as illustrated in (1) of FIG. 17, in a state where the outer edge channel CH4 is wavelength-controlled appropriately and a sufficient outer peripheral margin is ensured (wavelength shift amount is "0"), it is possible to obtain the phase detection sensitivity which is sufficiently high to maintain the phase synchronization.

However, as illustrated in (2) and (3) of FIG. 17, as the wavelength shift amount of the outer edge channel CH4 increases and the channel CH4 approaches the outer edge of the WSS transmission band, the phase detection sensitivity decreases.

By using this tendency (which may be referred to as "correlation"), it is possible to accurately detect the approach to the outer edge of the WSS transmission band of the outer edge channel CH4. Meanwhile, an example of FIG. 17 is an example that focuses on the outer edge channel CH4 on the long wavelength side, but the same applies to the outer edge channel CH1 on the short wavelength side. For example, as the outer edge channel CH1 approaches the outer edge of the short wavelength side of the WSS transmission band, the phase detection sensitivity tends to decrease.

Comparing the phase detection sensitivity characteristics A with the Q value characteristics B of FIG. 17, it can be seen that there are violent fluctuations in the Q value characteristics B even if there is a sufficient outer peripheral margin between the channel CH4 (or CH1, hereinafter the same) and the outer edge of the WSS transmission band.

In other words, there is no or low correlation between the wavelength shift amount (i.e., approach to the outer edge of the WSS transmission band of the channel CH4) and the change of the Q value. Therefore, it can be said that it is not practical to accurately detect the approach to the outer edge of the WSS transmission band of the channel CH4 on the basis of the Q value.

Therefore, the reception digital signal processor 723 of the first embodiment monitors the phase detection sensitivity of the sampling phase synchronization unit 92 by the phase detection sensitivity monitor 921, and outputs the phase detection sensitivity monitor value, which is the monitoring result, to the outer edge approach analyzer 734 (see FIG. 14).

The outer edge approach analyzer 734 detects that the outer edge channel has approached the outer edge of the WSS transmission band based on the phase detection sensitivity monitor value. Alternatively, the outer edge approach analyzer 734 analyzes and determines whether the outer edge channel passes over the outer edge of the WSS transmission band based on the phase detection sensitivity monitor value.

The detection or the analysis and determination of the outer edge channel's approach to the WSS transmission band may be performed by comparing the phase detection sensitivity monitor value and a threshold value (may be referred as "outer edge approach threshold"). The outer edge approach threshold may be determined based on the known performance of the sampling phase synchronization unit 92.

For example, when the performance of a production test or the design of the sampling phase synchronization unit 92 is evaluated, the sampling phase synchronization unit 92 can obtain the limit value of the phase detection sensitivity at which the phase synchronization established state can be maintained. Therefore, the limit value or the value obtained on the basis of the limit value may be set as the outer edge approach threshold.

Alternatively, while the wavelength control is actually performed on the outer edge channel in the direction toward the outer edge of the WSS transmission band before starting the operation of the system, the Q value or the bit error rate (BER) of the reception signal is measured, and the outer edge approach threshold may be set based on the value measured when a phase synchronization shift has occurred.

Since the outer edge approach threshold is a value based on the actual measurement value of the Q value or the BER, the outer edge approach threshold may be set as a threshold value in a state close to the actual operational environment rather than a design value or a value in the performance evaluation. Thus, it is possible to improve the accuracy of the detection, the analysis and the determination of the outer edge channel's approach to the WSS transmission band.

The outer edge approach analyzer 734 may output, for example, a result of comparison between the phase detection sensitivity monitor value from the phase detection sensitivity monitor 921 and the set outer edge approach threshold, as "outer edge approach information," to the frequency modulation pattern generator 733.

Alternatively, the outer edge approach analyzer 734 may calculate a distance between the outer edge channel and the outer edge of the WSS transmission band (may be referred to as "outer edge approach distance") based on the phase detection sensitivity monitor value, and output the calculation result as the "outer edge approach information" to the frequency modulation pattern generator 733.

In other words, the "outer edge approach information," which is superimposed by frequency modulation on the main signal light to the opposing station in the frequency modulation pattern generator 733 and notified to the opposing station, may be state information indicating that the phase detection sensitivity monitor value is equal to or less than a threshold value, or may be distance information indicating the outer edge approach distance. Meanwhile, since the outer edge approach distance information can be obtained by converting the wavelength shift amount into a distance because, as illustrated in FIG. 17, there is a correlation between the phase detection sensitivity and the wavelength shift amount.

The controller 83 of the opposing station (e.g., wavelength control amount calculator 832) performs the wavelength control of the outer edge channel such that the outer edge channel does not further approach the outer edge of the WSS transmission band based on the "outer edge approach information" that has been notified by the frequency modulation component superimposed on the main signal light.

For example, the wavelength control amount calculator 832 may stop the wavelength control of the transmission light source 814 corresponding to the outer edge channel, or may control the output wavelength of the transmission light source 814 such that the outer edge channel is wavelength-shifted in the direction toward the center of the WSS transmission band.

The wavelength shift may be performed continuously in stages, for example, until it is determined that the phase detection sensitivity monitor value in the phase detection sensitivity monitor 921 has been improved to a value sufficient to maintain the phase synchronization. The improvement of the phase detection sensitivity may be determined using a threshold value. The threshold value may be referred to as "outer edge separation threshold" for the "outer edge approach threshold." The "outer edge separation threshold" may be a value greater than the "outer edge approach threshold," and also may be determined and set in the same manner as the "outer edge approach threshold."

The controller 83 may perform, in addition to the wavelength control of the outer edge channel, the wavelength control of other channels of the super-channel including the outer edge channel. For example, if there is a sufficient outer peripheral margin for the WSS transmission band in a second outer edge channel located on the opposite side to a first outer edge channel to be controlled in a wavelength region, each channel of the super-channel may be shifted as a whole in a direction from the first outer edge channel toward the second outer edge channel.

Alternatively, it is also possible to ensure the wavelength shift amount of the outer edge channel by narrowing each channel spacing of the super-channel. If each channel spacing is narrowed, a crosstalk may occur due to an interchannel interference, thereby degrading the transmission signal quality. However, if it is determined that the degradation due to the crosstalk is smaller than the degradation of the transmission signal quality due to the outer edge channel's approach to the outer edge of the WSS transmission band, the wavelength control may be allowed to narrow the channel spacing.

Figure 18:
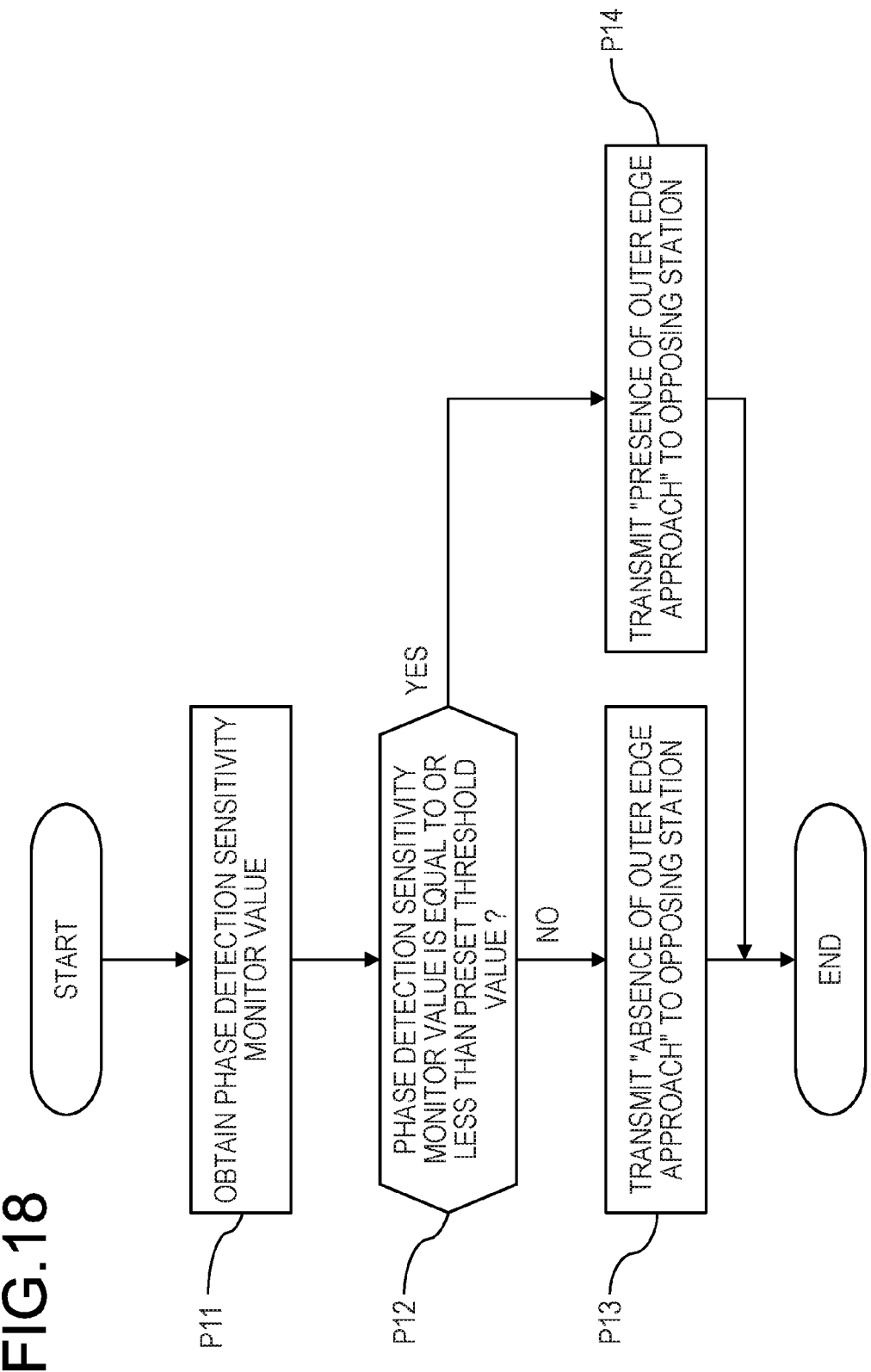
FIG. 18 is a flowchart illustrating an operation example of a monitor transponder of the first embodiment.
Figure 19:
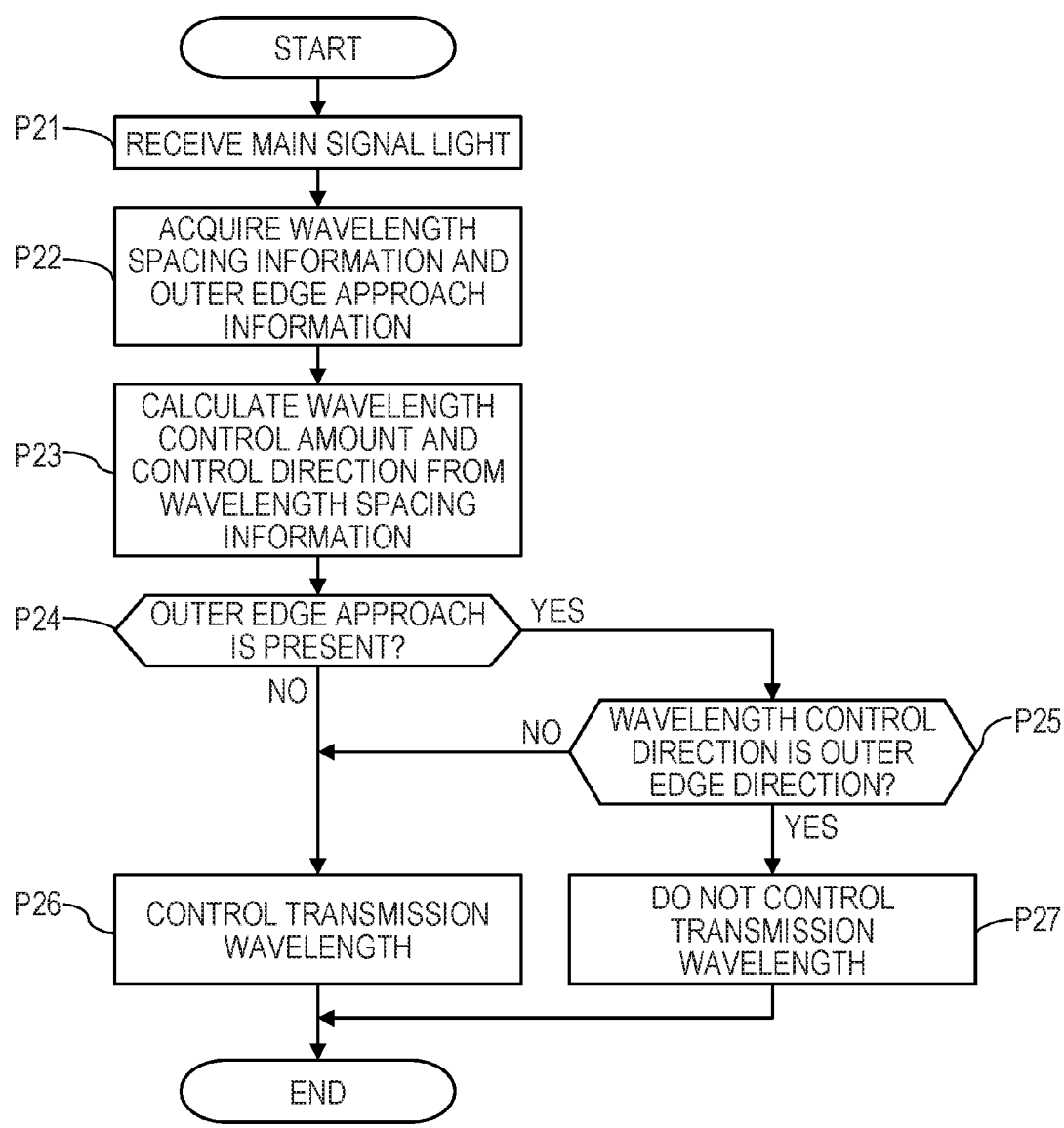
FIG. 19 is a flowchart illustrating an operation example of a wavelength control target transponder of the first embodiment.

Hereinafter, an operation of the first embodiment will be described with reference to flowcharts illustrated in FIGS. 18 and 19. FIG. 18 is a flowchart illustrating an operation example of the monitor transponder 70 which performs the outer edge approach detection. FIG. 19 is a flowchart illustrating an operation example of the wavelength control target transponder 80 which performs the wavelength control based on the outer edge approach detection result.

[Operation Example of Monitor Transponder]

As illustrated in FIG. 18, in the receiver 72 (e.g., receiver D2 of FIG. 8) of the transponder 70, the phase detection sensitivity is monitored by the phase detection sensitivity monitor 921 of the reception digital signal processor 723 (Operation P11). The phase detection sensitivity monitor value obtained by the monitor is provided to the outer edge approach analyzer 734.

The outer edge approach analyzer 734 determines whether the phase detection sensitivity monitor value is equal to or less than a preset threshold value (outer edge approach threshold) (Operation P12).

As a result of the determination, if the phase detection sensitivity monitor value exceeds the outer edge approach threshold (NO in Operation P12), the outer edge approach analyzer 734 outputs the outer edge approach information indicating "absence of outer edge approach" to the frequency modulation pattern generator 733 (Operation P13). Meanwhile, the Operation P13 may be unnecessary by setting the information indicating "absence of outer edge approach" so as not to be transmitted to the opposing station.

In the meantime, if the phase detection sensitivity monitor value is equal to or less than the outer edge approach threshold (YES in Operation P12), the outer edge approach analyzer 734 outputs the outer edge approach information indicating "presence of outer edge approach" to the frequency modulation pattern generator 733 (Operation P14).

The frequency modulation pattern generator 733 incorporates the outer edge approach information in addition to the input information from the wavelength spacing monitor 732 into the frequency modulation pattern, and inputs the frequency modulation pattern to the transmission digital signal processor 711 of the transmitter 71 (e.g., transmitter D1 of FIG. 8).

The transmission digital signal processor 711 frequency-modulates the carrier of the main signal light according to the frequency modulation pattern, and transmits the information superimposed on the main signal light to the transponder 80 of the opposing station.

Meanwhile, a method of transmitting the outer edge approach information to the opposing station is not limited to the superimposition on the main signal light by frequency modulation. For example, if the transmitting station is a communication path (may be referred to as "pass" or "channel") that can communicate with the opposing station, any communication path may be used for the transmission of the outer edge approach information.

For example, the outer edge approach information may be mapped to an overhead (OH) of the main signal light addressed to the opposing station. However, if the OH of the main signal light of the wavelength control target channel is used for the transmission of the outer edge approach information, communication of the OH also becomes impossible due to interruption of the main signal light.

Therefore, the communication of the outer edge approach information may use a different communication path from the main signal light. The different communication path from the main signal light may be a communication path common to the outer edge approach information and other information, or a communication path prepared and set separately for the transmission of the outer edge approach information. Since the information amount of the outer edge approach information is smaller than the main signal, lower-speed communication may be used than the main signal. Thus, a communication path more resistant to load than the communication path of the main signal light may be used for the communication of the outer edge approach information.

[Operation Example of Wavelength Control Target Transponder]

Next, an operation example of the transponder 80 of the opposing station will be described with reference to FIG. 19. In the transponder 80, the receiver 82 (e.g., receiver D1 of FIG. 8) receives the main signal light transmitted from the transponder 70 of the opposing station (Operation P21). On the main signal light, the wavelength spacing information (or wavelength control information) and the outer edge approach information are superimposed as a frequency modulation component.

The frequency modulation component is detected by the FM detector 820 or the carrier frequency offset monitor 830, and the detection result is decoded by the frequency modulation pattern decoder 831. Accordingly, the wavelength spacing information (or wavelength control information) and the outer edge approach information superimposed on the main signal light are decoded (Operation P22).

Meanwhile, if the wavelength spacing information (or wavelength control information) and the outer edge approach information are transmitted by the different communication path from the main signal light, as described above, each information is acquired by the receiver 82 by the reception processing according to the communication path.

The decoded (or acquired) information is provided to the wavelength control amount calculator 832, and the wavelength control amount calculator 832 calculates the wavelength control amount and control direction of the transmission light source 814 of the transmitter 81 based on the wavelength spacing information (or wavelength control information) (Operation P23).

Subsequently, the wavelength control amount calculator 832 checks whether the outer edge approach information indicates "presence of outer edge approach" (Operation P24).

As a result of the checking, if the outer edge approach information does not indicate "presence of outer edge approach" (NO in Operation P24), the wavelength control amount calculator 832 may perform the control of the transmission wavelength of the transmitter 81 (e.g., transmitter D2 of FIG. 8) with the calculated wavelength control amount and control direction (Operation P26).

In the meantime, if the outer edge approach information indicates "presence of outer edge approach" (YES in Operation P24), the wavelength control amount calculator 832 determines whether the wavelength control direction is a direction approaching the WSS transmission band (Operation P25).

As a result of the determination, if the wavelength control direction is a direction away from the outer edge of the WSS transmission band (NO in Operation P25), the wavelength control amount calculator 832 may perform the control of the transmission wavelength of the transmitter D2 with the wavelength control amount and control direction calculated in Operation P23 (Operation P26).

In contrast, if the wavelength control direction is a direction approaching the outer edge of the WSS transmission band (YES in Operation P25), the wavelength control amount calculator 832 may not perform (may stop) the control of the transmission wavelength of the transmitter D2 (Operation P27).

As described above, by performing the wavelength control by accurately detecting that the outer edge channel has approached the outer edge of the WSS transmission band, it is possible to avoid the transmission signal quality of the outer edge channel from being degraded as the outer edge channel excessively approaches the outer edge of the WSS transmission band. Therefore, it is possible to prevent the signal interruption of the outer edge channel in the worst case.

Further, in the communication of the outer edge approach information, by using the superimposition on the main signal light by the frequency modulation similarly to the communication of the wavelength spacing information (or wavelength control information), these communications (may be collectively referred to as "control communication") may be shared.

Therefore, it is possible to simplify the configuration related to the control communication according to the sharing, thereby realizing a highly reliable wavelength control at low cost. As a result, as illustrated in Table 1, it is possible to improve the transmission quality by ensuring the outer peripheral margin, or improve the frequency band utilization efficiency.

Second Embodiment

In the first embodiment, the wavelength control based on the outer edge approach information about the outer edge channel adjacent to the outer edge of one side (e.g., longer wavelength side) of the WSS transmission band has been described. In a second embodiment, the wavelength control based on the outer edge approach information about the outer edge channels adjacent to the outer edges of opposite sides (i.e., a short wavelength side and a long wavelength side) of the WSS transmission band will be described.

For example, if it is detected that one of two outer edge channels adjacent to both outer edges of the WSS transmission band has approached the outer edge of the WSS transmission band, the wavelength control of the transmission wavelength is determined using in combination the outer edge approach information of the other outer edge channel on the opposite side.

[Configuration Example of System]

Figure 20:
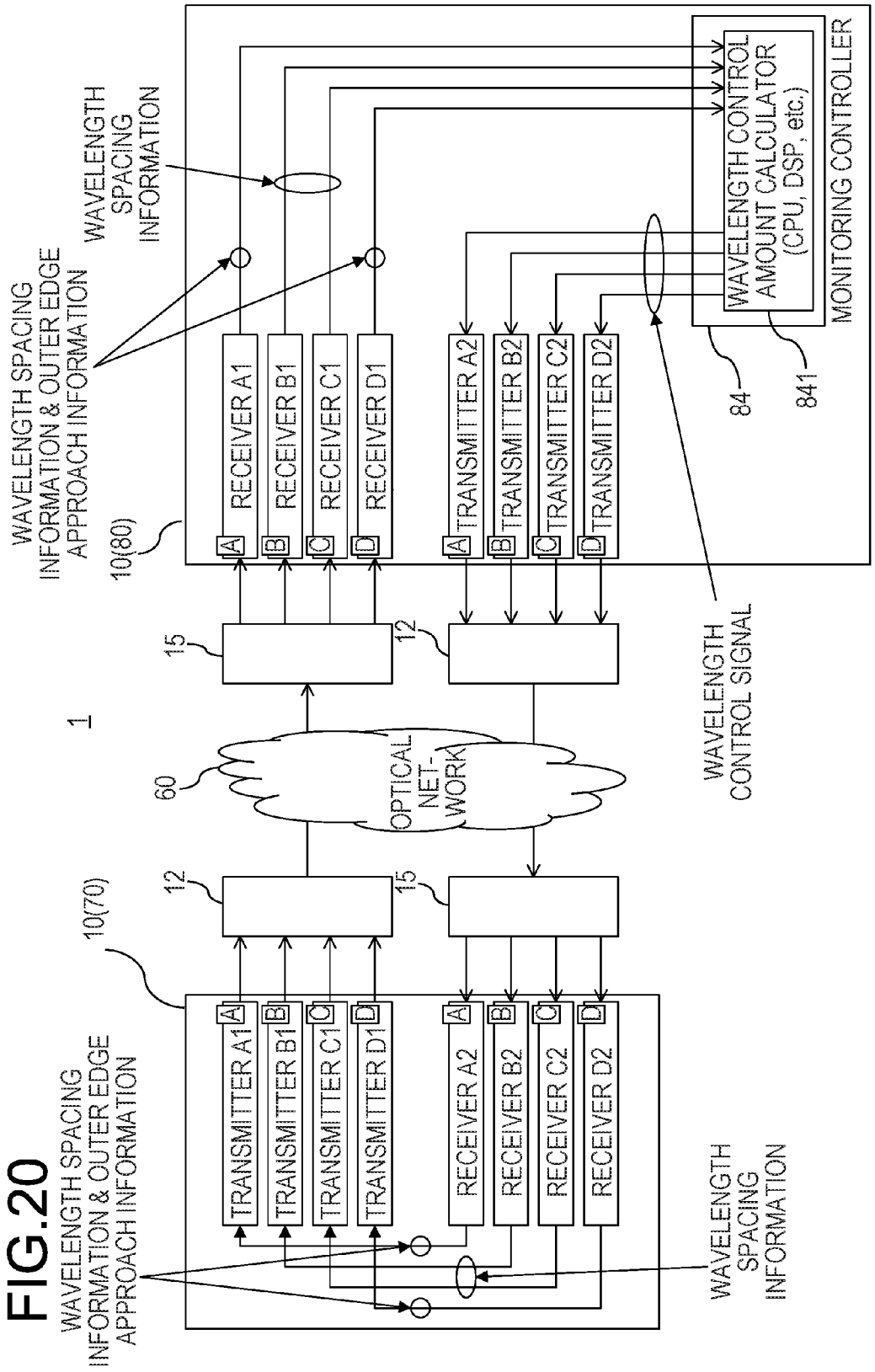
FIG. 20 is a block diagram illustrating an exemplary configuration of an optical transmission system of a second embodiment.

FIG. 20 is a block diagram illustrating a configuration example of the optical transmission system 1 according to the second embodiment. FIG. 20 illustrates an example of applying the transponders 70 and 80 having the configuration illustrated in FIG. 14 to the network configuration illustrated in FIG. 8.

In FIG. 20, the transponder 70 includes, for example, four transmitters A1, B1, C1, and D1 and four receivers A2, B2, C2, and D2.

By way of example, the transmitter A1 and the receiver A2 form a pair of a transmitter and a receiver, and the transmitter B1 and the receiver B2 form a pair of a transmitter and a receiver.

Similarly, for example, the transmitter C1 and the receiver C2 form a pair of a transmitter and a receiver, and the transmitter D1 and the receiver D2 form a pair of a transmitter and a receiver.

Four sets, each including a pair of a transmitter and a receiver, may be regarded as corresponding to the four sub-channels CH1 to CH4, respectively, forming the super-channel. For example, it may be considered that the sub-channel CH1 corresponds to the shortest wavelength of the super-channel, the sub-channel CH4 corresponds to the longest wavelength of the super-channel, and the sub-channels CH2 and CH3 correspond to intermediate wavelengths.

In other words, it may be considered that a pair of the transmitter A1 and the receiver A2 transmits and receives the signal light of the outer edge channel CH1 adjacent to the outer edge of the short wavelength side of the WSS transmission band. In addition, it may be considered that a pair of the transmitter D1 and the receiver D2 transmits and receives the signal light of the outer edge channel CH4 adjacent to the outer edge of the long wavelength side of the WSS transmission band. However, the number of sub-channels may be two or more without being limited to four.

It may be considered that a pair of the transmitter B1 and the receiver B2 and a pair of the transmitter C1 and the receiver C2 transmit and receive the signal lights of the intermediate channels CH2 and CH3 between the outer edge channels CH1 and CH4, respectively.

Each of the four sets of transceiver pairs A1-A2, B1-B2, C1-C2, and D1-D2 may be regarded as corresponding to, for example, a pair of the transmitter 71 and the receiver 72 in the transponder 70 illustrated in FIG. 14. However, in FIG. 20, the controller 73 of the transponder 70 illustrated in FIG. 14 is omitted.

The receivers A2, B2, C2, and D2 may, respectively, transmit and input the wavelength spacing information obtained by the above-described channel spacing monitor to the transmitters A1, B1, C1, and D1 forming transceiver pairs via the controller 73.

In addition, the receivers A2 and D2 corresponding to the outer edge channels CH1 and CH4 may, respectively, transmit and input the outer edge approach information obtained by the above-described outer edge approach analyzer 734, in addition to the wavelength spacing information, to the transmitters A1 and D1 forming transceiver pairs via the controller 73. However, the receivers B2 and C2 corresponding to the intermediate channels may also transmit and input the outer edge approach information, in addition to the wavelength spacing information, to the transmitters B1 and C1.

Therefore, each of the transmitters A1, B1, C1, and D1 may transmit the wavelength spacing information or the wavelength spacing information and the outer edge approach information, as described above, so as to be superimposed on the main signal light by frequency modulation, to the transponder 80 of the opposing station.

Meanwhile, in FIG. 20, the transponder 80 of the opposing station to the transponder 70 includes, for example, four receivers A1, B1, C1, and D1, four transmitters A2, B2, C2, and D2, and a monitoring controller 84.

In the transponder 80 illustrated in FIG. 20, for example, the transmitter A2 and the receiver A1 form one transceiver pair, and the transmitter B2 and the receiver B1 form one transceiver pair.

Similarly, for example, the transmitter C2 and the receiver C1 form one transceiver pair, and the transmitter D2 and the receiver D1 form one transceiver pair.

The receivers A1, B1, C1, and D1, respectively, receive the signal lights of the channels CH1 to CH4 transmitted by the transmitters A1, B1, C1, and D1 in the transponder 70 of the opposing station.

If the wavelength spacing information (or wavelength spacing information and the outer edge approach information) is superimposed on the received signal light by frequency modulation, each of the receivers A1, B1, C1, and D1 may decode the superimposed information as described above.

Each of the receivers A1, B1, C1, and D1 may transmit and input the decoded wavelength spacing information (or wavelength spacing information and the outer edge approach information) to the monitoring controller 84.

The monitoring controller 84 may individually (may also be referred to as "selectively") control the transmission wavelengths of the transmitters A2, B2, C2, and D2 based on the wavelength spacing information (or wavelength spacing information and the outer edge approach information) input from each of the receivers A1, B1, C1, and D1. Therefore, the monitoring controller 84 may be a common controller for the transmitters A2, B2, C2, and D2, and, for example, may be provided in the line-card controller 114-1 illustrated in FIG. 2.

For example, the monitoring controller 84 includes a wavelength control amount calculator 841. The wavelength control amount calculator 841 may individually obtain the wavelength shift amount and the wavelength control direction of the transmission wavelengths of the transmitters A2, B2, C2, and D2 based on the input information from each of the receivers A1, B1, C1, and D1.

The monitoring controller 84 may be implemented, similarly to the above-described controller 114, by using a processor device, such as a CPU or DSP, having computing capabilities and a storage device such as a memory. By allowing the processor device to operate by appropriately reading data or a program corresponding to the control stored in the storage device, the function as the monitoring controller 84 (wavelength control amount calculator 841) may be embodied. The monitoring controller 84 may be implemented, similarly to the above-described controller 114, by using an ASIC, a FPGA or the like.

The transmitters A2, B2, C2, and D2, respectively, transmit the signal lights of the channels CH1 to CH4 received by the receivers A2, B2, C2, and D2 in the transponder 70 of the opposing station.

[Operation Example]

Figure 21:
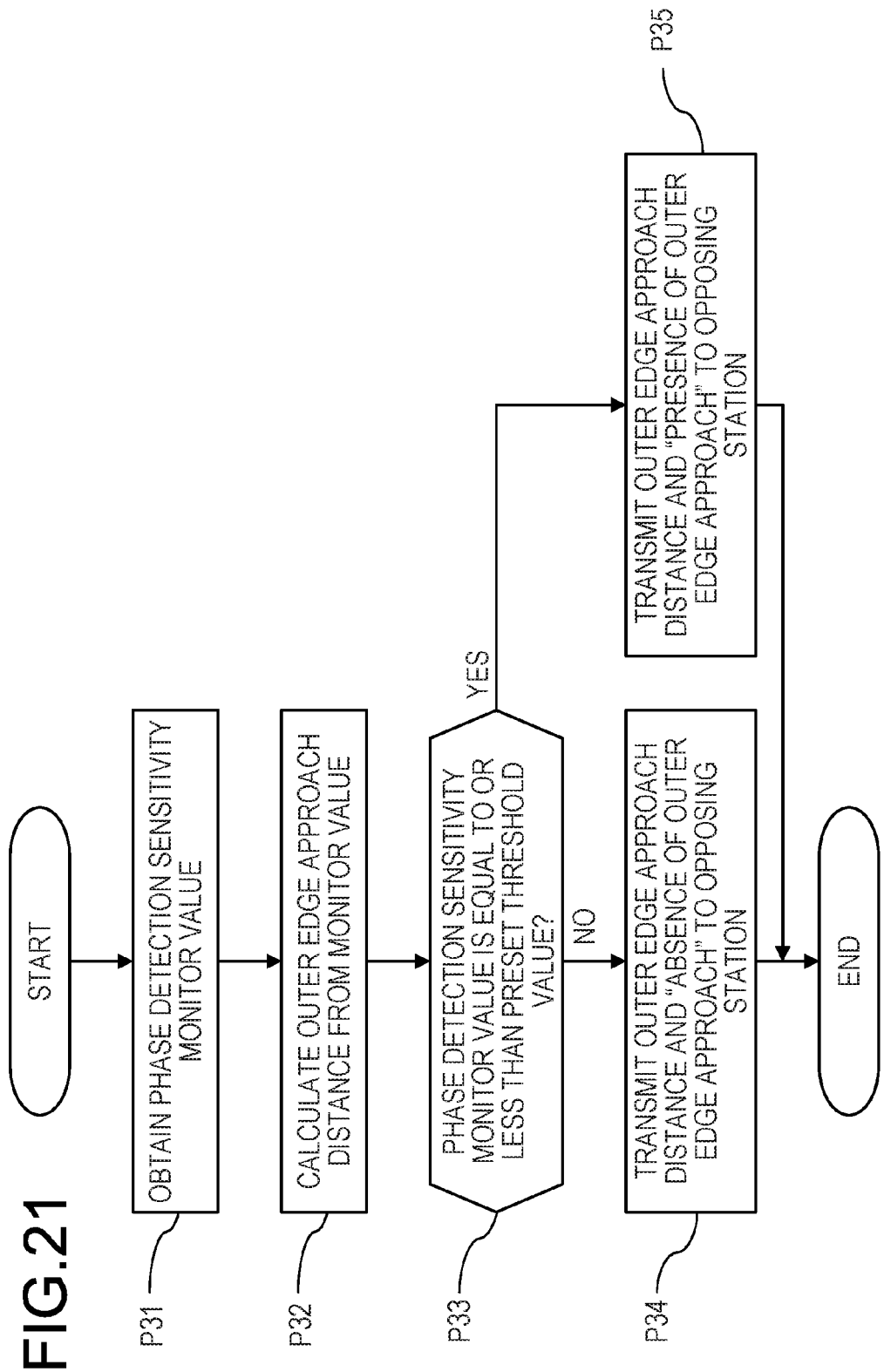
FIG. 21 is a flowchart illustrating an operation example of a monitor transponder of the second embodiment.
Figure 22:
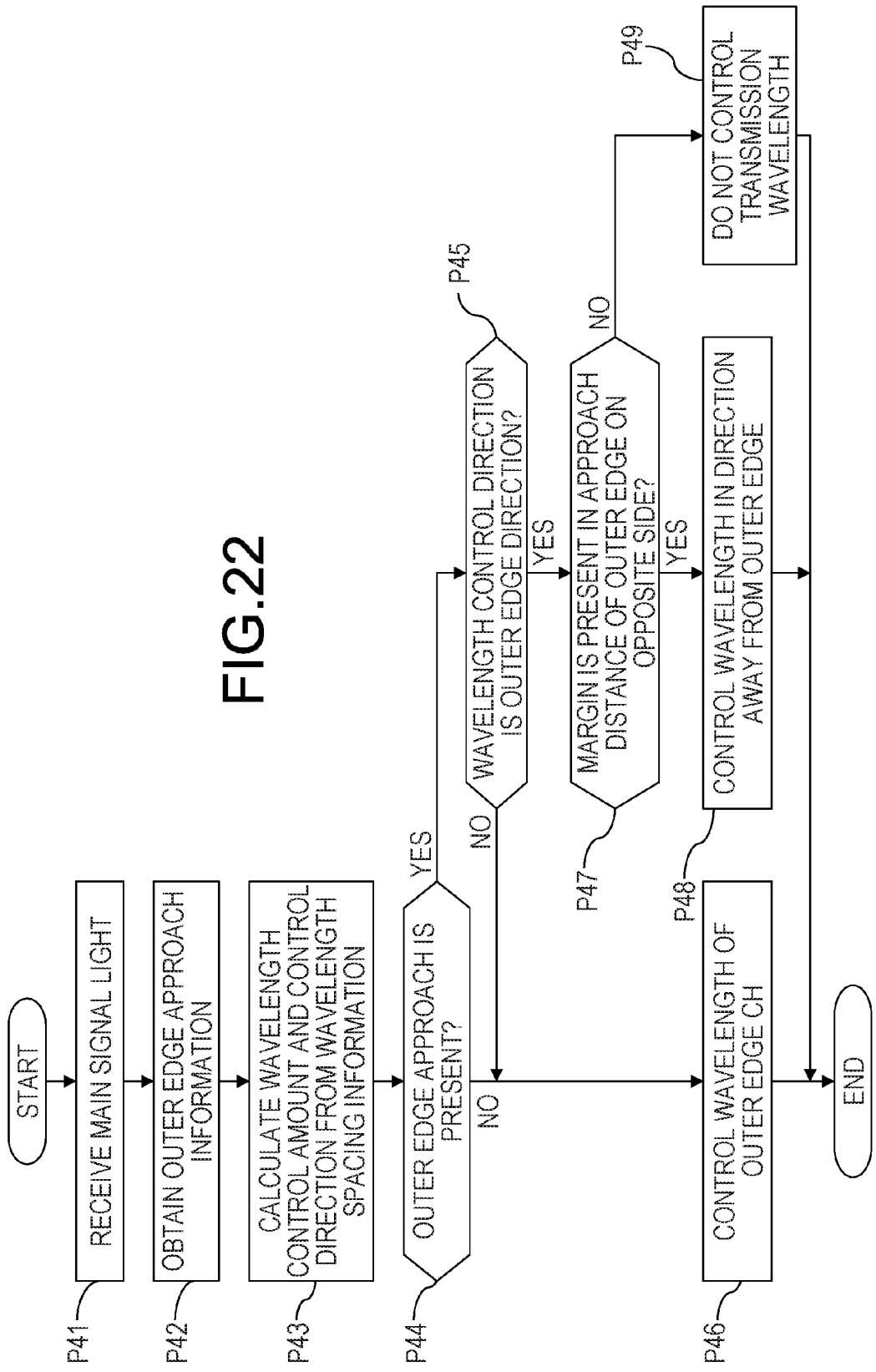
FIG. 22 is a flowchart illustrating an operation example of a wavelength control target transponder of the second embodiment.

Hereinafter, an operation of the second embodiment will be described with reference to FIGS. 21 and 22. FIG. 21 is a flowchart illustrating an operation example of the (monitor) transponder 70. FIG. 22 is a flowchart illustrating an operation example of the (wavelength control target) transponder 80.

[Operation Example of Monitor Transponder]

As illustrated in FIG. 21, in the receiver 72 of the transponder 70, the phase detection sensitivity is monitored by the phase detection sensitivity monitor 921 of the reception digital signal processor 723 (Operation P31). The phase detection sensitivity monitor value obtained by the monitor is provided to the outer edge approach analyzer 734. The monitoring of the phase detection sensitivity may be implemented by each of the receivers A2, B2, C2, and D2 of FIG. 20.

The outer edge approach analyzer 734 obtains the outer edge approach distance by converting, for example, the wavelength shift amount into a distance, as illustrated in FIG. 17, based on the correlation between the phase detection sensitivity and the wavelength shift amount (Operation P32). The outer edge approach distance may be obtained by each of the receivers A2, B2, C2, and D2 of FIG. 20, or may be obtained by only each of the receivers A2 and D2 corresponding to the outer edge channels.

The outer edge approach analyzer 734 determines whether the phase detection sensitivity monitor value is equal to or less than a preset threshold value (outer edge approach threshold) (Operation P33).

As a result of the determination, if the phase detection sensitivity monitor value exceeds the outer edge approach threshold (NO in Operation P33), the outer edge approach analyzer 734 outputs the outer edge approach information including information indicating "absence of outer edge approach" and outer edge approach distance information to the frequency modulation pattern generator 733.

Thus, the information indicating "absence of outer edge approach" and the outer edge approach distance information are superimposed by frequency modulation on the main signal light to be transmitted from the corresponding transmitter 71 to the opposing station, and each information is transmitted to the opposing station (Operation P34). Meanwhile, the information indicating "absence of outer edge approach" may be set so as not to be transmitted to the opposing station.

In the meantime, if the phase detection sensitivity monitor value is equal to or less than the outer edge approach threshold (YES in Operation P33), the outer edge approach analyzer 734 outputs the outer edge approach information including information indicating "presence of outer edge approach" and outer edge approach distance information to the frequency modulation pattern generator 733.

Thus, the information indicating "presence of outer edge approach" and the outer edge approach distance information are superimposed by frequency modulation on the main signal light to be transmitted from the corresponding transmitter 71 to the opposing station, and each information is transmitted to the opposing station (Operation P35).

Meanwhile, the transmitter 71 for transmitting the outer edge approach information may be limited to the transmitters A and D of FIG. 20 corresponding to the outer edge channels.

A method of transmitting the outer edge approach information to the opposing station is not limited to the superimposition on the main signal light by frequency modulation, and may be a method using another communication path similarly to the first embodiment.

[Operation Example of Wavelength Control Target Transponder]

As illustrated in FIG. 22, in the transponder 80 of the opposing station, the receiver 82 (e.g., receivers A1, B1, C1, and D1 of FIG. 20) receives the main signal light transmitted by the transponder 70 of the opposing station (Operation P41).

For example, the wavelength spacing information and the outer edge approach information are superimposed as a frequency modulation component on the main signal light to be received by the receiver 82 (e.g., receivers A1 and D1) corresponding to the outer edge channel. The outer edge approach information includes information indicating "presence of outer edge approach" or "absence of outer edge approach," or the information and the outer edge approach distance information.

For example, the wavelength spacing information is superimposed as a frequency modulation component on the main signal light to be received by the receiver (e.g., receivers B1 and C1) corresponding to the intermediate channels between the outer edge channels.

The frequency modulation component is detected by the FM detector 820 or the carrier frequency offset monitor 830, and the detection result is decoded by the frequency modulation pattern decoder 831. Thus, in the receiver 82 (A1, B1, C1, and D1) corresponding to each channel of the super-channel, the wavelength spacing information superimposed on the main signal light is decoded.

In the receivers A1 and D1 corresponding to the outer edge channels among the receivers A1, B1, C1, and D1, the outer edge approach information is decoded in addition to the wavelength spacing information (Operation P42).

The wavelength spacing information and the outer edge approach information may be transmitted, as described above, by a different communication path from the main signal light, in which case each information is acquired by the receiver 82 by the reception processing according to the communication path.

The decoded (or acquired) information is provided to the wavelength control amount calculator 841 of the monitoring controller 84. The wavelength control amount calculator 841 calculates the wavelength control amount and control direction of the transmission light source 814 of the transmitter 81 based on the wavelength spacing information (or wavelength control information) (Operation P43).

Subsequently, the wavelength control amount calculator 841 checks whether the outer edge approach information indicates "presence of outer edge approach" (Operation P44).

As a result of the checking, if the outer edge approach information does not indicate "presence of outer edge approach" (NO in Operation P44), the wavelength control amount calculator 841 may perform the control of the transmission wavelength on a wavelength basis with the calculated wavelength control amount and control direction (Operation P46).

For example, the wavelength control amount calculator 841 may control the transmission wavelength of the transmitter 82 (transmitter D2) corresponding to the outer edge channel CH4 with the calculated wavelength control amount and control direction.

In the meantime, if the outer edge approach information indicates "presence of outer edge approach" (YES in Operation P44), the wavelength control amount calculator 841 determines whether the wavelength control direction is a direction approaching the WSS transmission band (Operation P45).

As a result of the determination, if the wavelength control direction is a direction away from the outer edge of the WSS transmission band (NO in Operation P45), the wavelength control amount calculator 841 may control the transmission wavelength of the outer edge channel with the wavelength control amount and control direction calculated in Operation P43 (Operation P46).

In contrast, if the wavelength control direction is a direction approaching the outer edge of the WSS transmission band (YES in Operation P45), the wavelength control amount calculator 841 may determine, based on the outer edge approach distance information obtained by Operation P42, whether there is a margin in the approach distance of the outer edge on the opposite side (Operation P47).

For example, if the outer edge channel CH4 on the long wavelength side approaches the outer edge of the long wavelength side of the WSS transmission band, it is determined whether there is an outer peripheral margin between the outer edge channel CH1 on the short wavelength side and the outer edge of the short wavelength side of the WSS transmission band.

As a result of the determination, if there is an outer peripheral margin on the opposite side (YES in Operation P47), the wavelength control amount calculator 841 may control the transmission wavelength of each transmitter 81, for example, such that all the channels CH1 to CH4 are separated from the outer edge of the long wavelength side of the WSS transmission band (Operation P48). In this case, the wavelength control amount (shift amount) may be in a range such that the phase detection sensitivity monitor value for the outer edge channel (e.g., channel CH1) on the opposite side does not fall below a threshold value.

In the meantime, if there is no outer peripheral margin on the opposite side (NO in Operation P47), the wavelength control amount calculator 841 may not perform (may stop) the control of the transmission wavelength of each transmitter 81 (Operation P49).

Alternatively, the wavelength control amount calculator 841 may control the transmission wavelength in a direction away from the outer edge with respect to only the transmitter 81 (e.g., transmitter D2) corresponding to the outer edge channel (e.g., outer edge channel CH4 on the long wavelength side) approaching the outer edge of the WSS transmission band.

As described above, in the second embodiment, based on the approach distance information of the outer edge channels for both the long wavelength side and the short wavelength side of the WSS transmission band, it is determined whether the wavelength control of each channel is necessary or unnecessary, and appropriate wavelength control is implemented according to the determination result.

For example, by determining the wavelength control direction in which there is an outer peripheral margin from the outer edge approach distance information of the outer edge channels adjacent to both outer edges of the WSS transmission band, each channel may be wavelength-shifted in the direction in which there is an outer peripheral margin.

Therefore, similarly to the first embodiment, it is possible to prevent the transmission signal quality of the outer edge channel from being degraded, thereby preventing the signal interruption in the worst case, and it is also possible to improve the frequency utilization efficiency of the WSS transmission band.

Third Embodiment

In the first and second embodiments, an example of performing the wavelength control based on the outer edge approach information of the outer edge channel adjacent to one or both of the outer edges of the WSS transmission band has been described.

However, in the wavelength control of the first and second embodiments, for example, if the phase detection sensitivity for all the channels forming the super-channel is degraded uniformly due to a failure occurring in the optical transmission line 20, an erroneous wavelength control may be carried out.

For example, if the phase detection sensitivity is monitored for only the outer edge channel, it cannot be determined whether a reduction in the phase detection sensitivity is caused by the approach to the outer edge of the WSS transmission band, or an event other than the approach to the outer edge such as a failure occurring in the optical transmission line 20.

Therefore, even though a failure occurs in the optical transmission line 20, it may be erroneously determined that a reduction in the phase detection sensitivity of the outer edge channel is caused by the approach to the outer edge of the WSS transmission band, and an unnecessary wavelength control may be carried out.

Therefore, in a third embodiment, in addition to the outer edge approach information of the outer edge channels described in the first and second embodiments, the phase detection sensitivity monitor value for the intermediate channels between the outer edge channels is fed back to the opposing station.

In the opposing station, if the phase detection sensitivity monitor value of the intermediate channels is reduced, it can be determined that the phase detection sensitivity of the outer edge channels is reduced because the phase detection sensitivity for all the channels forming the super-channel is degraded uniformly due to a failure occurring in the optical transmission line 20.

Depending on the determination, the opposing station may not perform the transmission wavelength control of the outer edge channel as described in the first embodiment and the second embodiment, thereby preventing the implementation of unnecessary wavelength control.

[Configuration Example of System]

Figure 23:
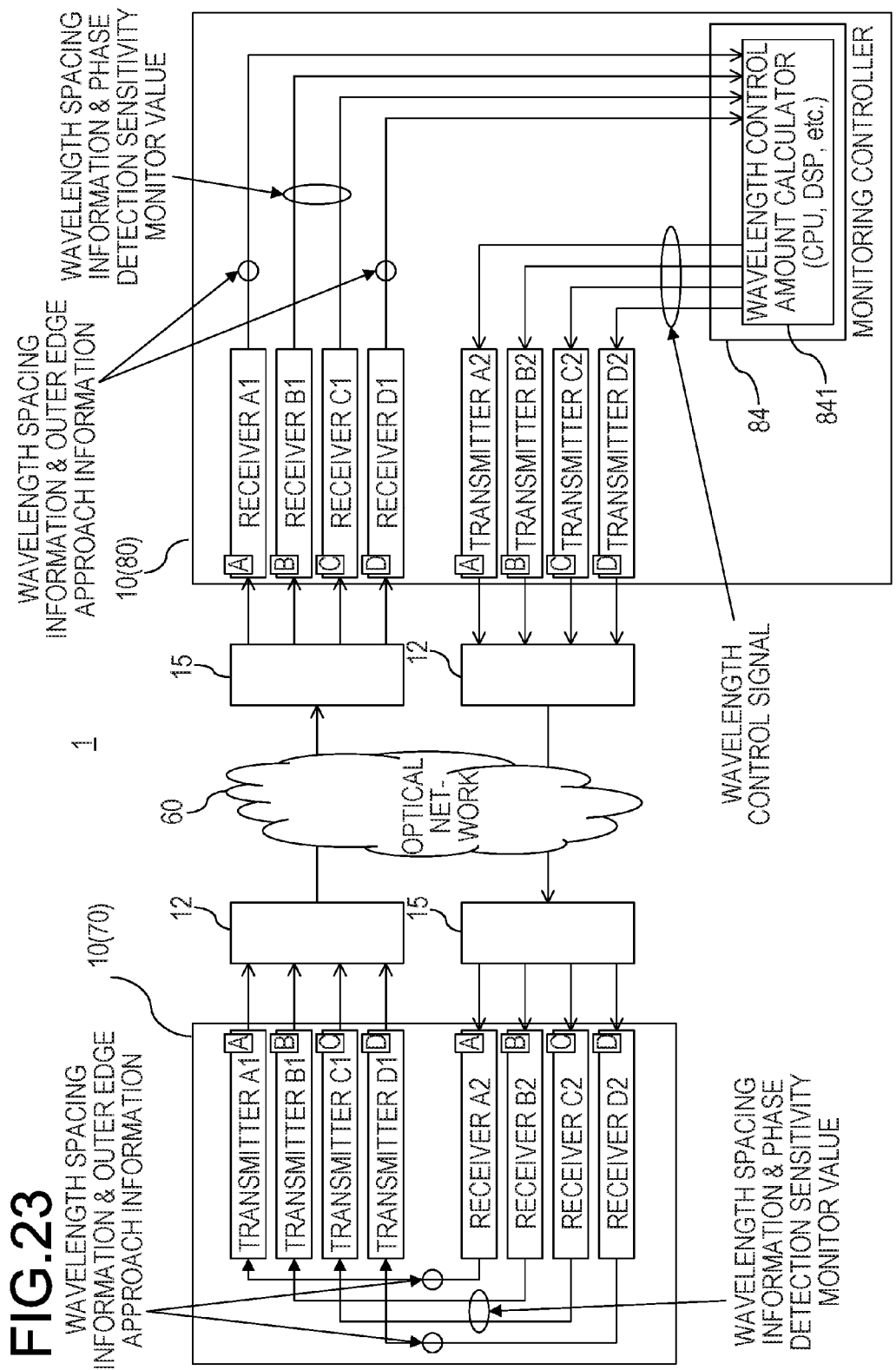
FIG. 23 is a block diagram illustrating an exemplary configuration of an optical transmission system of a third embodiment.

FIG. 23 illustrates a configuration example of the optical transmission system 1 according to the third embodiment. The optical transmission system illustrated in FIG. 23 is different from the configuration illustrated in FIG. 20 of the second embodiment in information to be transmitted in the monitor transponder 70 and the wavelength control target transponder 80.

For example, in the monitor transponder 70, the receivers B2 and C2 corresponding to the intermediate channels CH2 and CH3, respectively, may transmit and input the phase detection sensitivity monitor value in addition to the wavelength spacing information to the transmitters B1 and C1.

Therefore, each of the transmitters B1 and C1 may transmit the wavelength spacing information and the phase detection sensitivity monitor value superimposed on the main signal light to the transponder 80 of the opposing station.

In the meantime, in the wavelength control target transponder 80, each of the receivers B2 and C2 corresponding to the intermediate channels CH2 and CH3, respectively, may decode the wavelength spacing information and the phase detection sensitivity monitor value superimposed on the main signal light. Further, each of the receivers B2 and C2 may transmit and input the decoding result to the wavelength control amount calculator 841 of the monitoring controller 84.

The wavelength control amount calculator 841 may determine whether the wavelength control of the outer edge channel is necessary or unnecessary based on the phase detection sensitivity monitor value of the intermediate channels, and may perform the wavelength control, for example, as in the second embodiment only if it is determined that the wavelength control is necessary.

[Operation Example]

Figure 24:
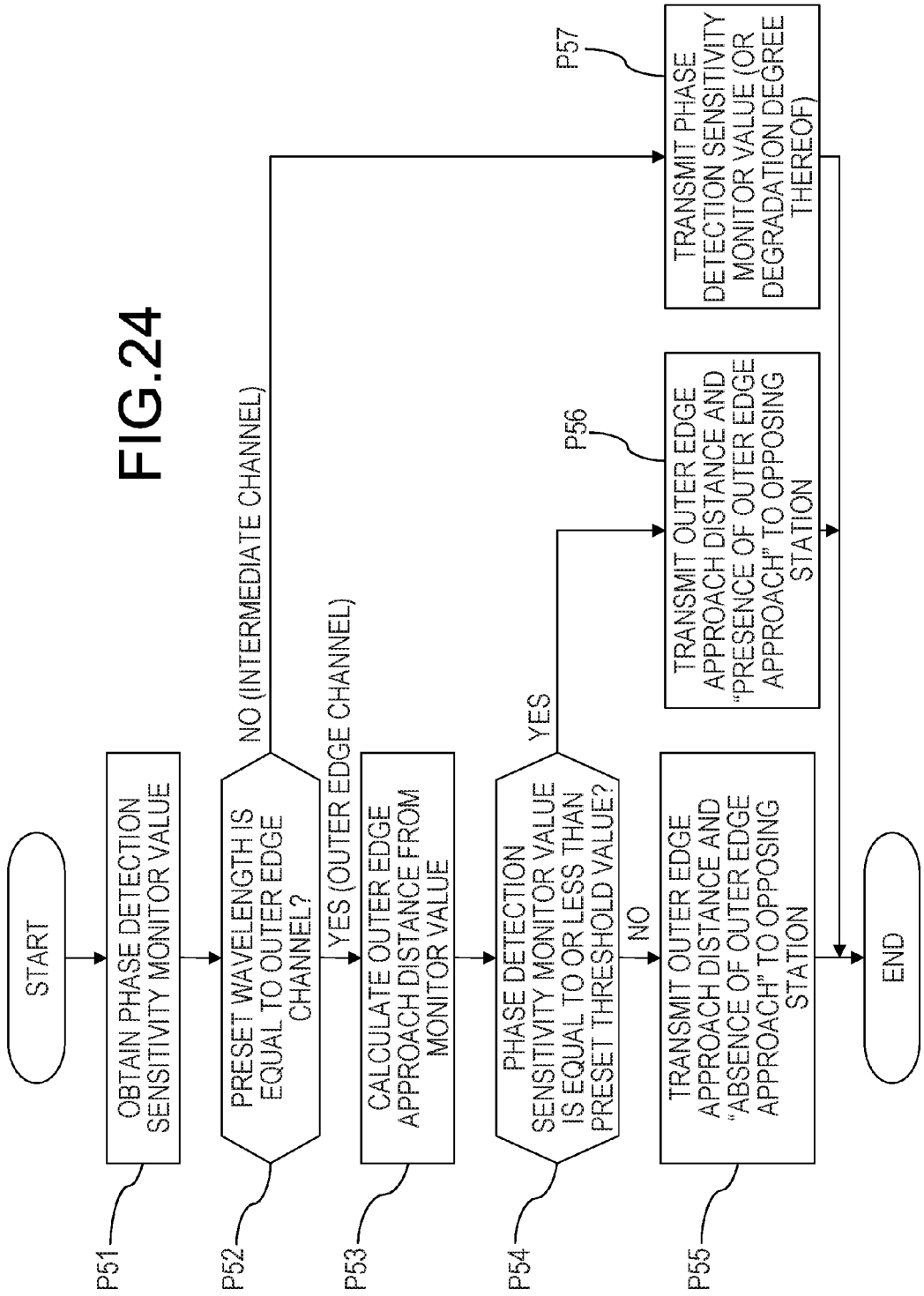
FIG. 24 is a flowchart illustrating an operation example of a monitor transponder of the third embodiment.
Figure 25:
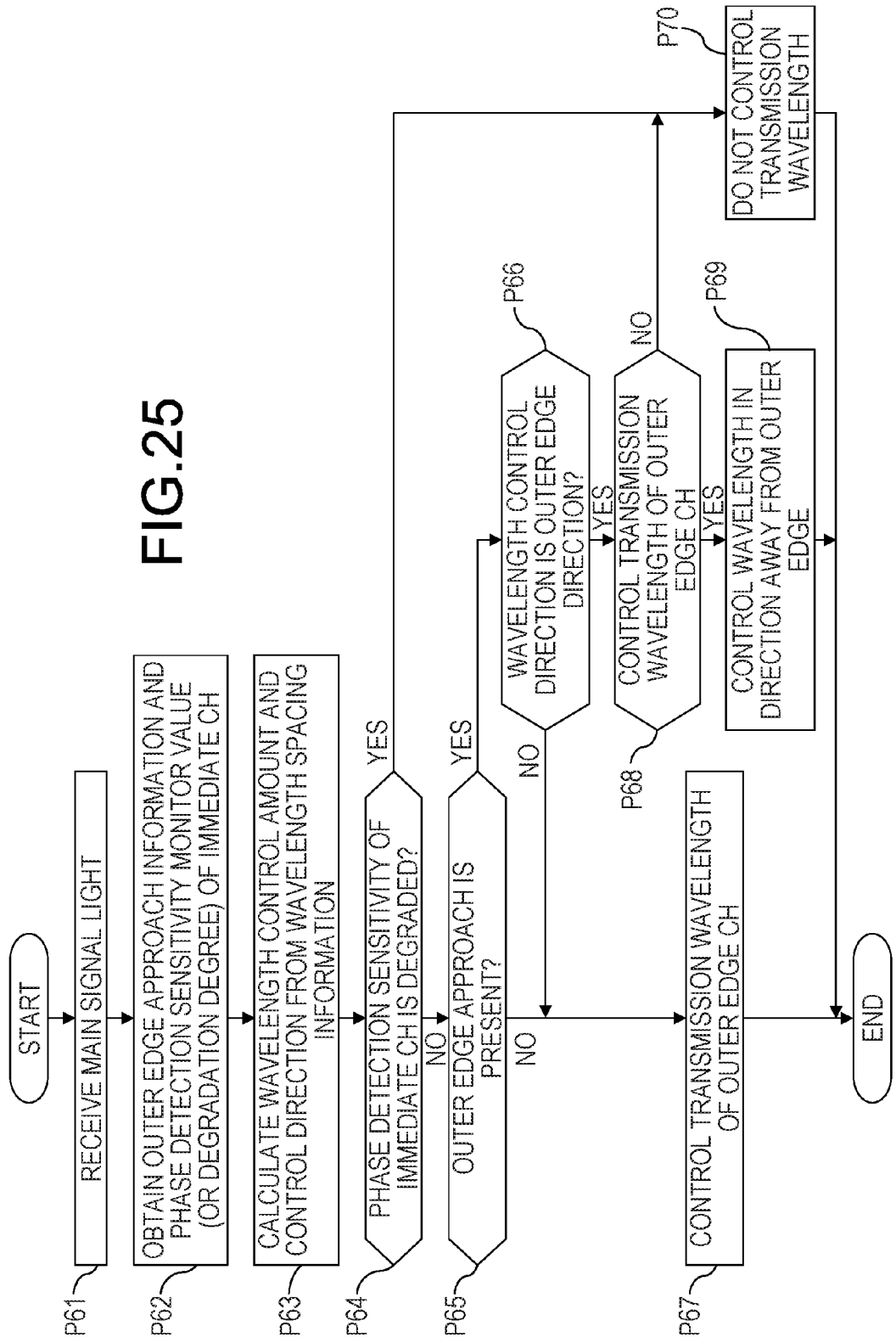
FIG. 25 is a flowchart illustrating an operation example of a wavelength control target transponder of the third embodiment.

Hereinafter, an operation of the third embodiment will be described with reference to FIGS. 24 and 25. FIG. 24 is a flowchart illustrating an operation example of the monitor transponder 70. FIG. 25 is a flowchart illustrating an operation example of the wavelength control target transponder 80.

[Operation Example of Monitor Transponder]

As illustrated in FIG. 24, in the receiver 72 of the transponder 70, the phase detection sensitivity is monitored by the phase detection sensitivity monitor 921 of the reception digital signal processor 723 (Operation P51). The phase detection sensitivity monitor value obtained by the monitor is provided to the outer edge approach analyzer 734. The monitoring of the phase detection sensitivity may be implemented by each of the receivers A2, B2, C2, and D2 of FIG. 20.

The outer edge approach analyzer 734 determines whether the provided phase detection sensitivity monitor value is a monitor value for the outer edge channel (Operation P52). This determination may be implemented, for example, based on setting information of the reception wavelength of the receiver 72, or information set in advance as the outer edge channel when the operation starts. If it corresponds to the outer edge channel, the outer edge approach analyzer 734 may determine that the phase detection sensitivity monitor value received from the receiver 72 is a monitor value for the outer edge channel.

As a result of the determination, if it is a monitor value for the outer edge channel, the outer edge approach analyzer 734 may transmit the information indicating the presence or absence of outer edge approach and the outer edge approach distance information to the opposing station, for example, in the same manner as Operations P32 to P35 of the second embodiment (FIG. 21) (Operations P53 to P56).

In the meantime, if the phase detection sensitivity monitor value received from the receiver 72 is a monitor value for the intermediate channel rather than a monitor value for the outer edge channel (NO in Operation P52), the outer edge approach analyzer 734 outputs the phase detection sensitivity monitor value to the frequency modulation pattern generator 733.

Thus, the phase detection sensitivity monitor value of the intermediate channel is superimposed by frequency modulation on the main signal light transmitted to the opposing station from the transmitter 71 corresponding to the intermediate channel, and the phase detection sensitivity monitor value of the intermediate channel is transmitted to the opposing station (Operation P57).

Meanwhile, instead of the phase detection sensitivity monitor value, the degradation degree of the phase detection sensitivity monitor value may be transmitted to the opposing station. The target channel for transmitting (feeding back) the phase detection sensitivity monitor value to the opposing station may include the outer edge channel without being limited to the intermediate channel. Further, a method of transmitting the phase detection sensitivity monitor value to the opposing station is not limited to the superimposition on the main signal light by frequency modulation, and may be a method using another communication path, as described above.

[Operation Example of Wavelength Control Target Transponder]

As illustrated in FIG. 25, in the wavelength control target transponder 80 of the opposing station, the receiver 82 (e.g., receivers A1, B1, C1, and D1 of FIG. 23) receives the main signal light transmitted by the transponder 70 of the opposing station (Operation P61).

For example, the wavelength spacing information and the outer edge approach information are superimposed as a frequency modulation component on the main signal light to be received by the receiver 82 corresponding to the outer edge channel (e.g., receivers A1 and D1 of FIG. 23).

Further, for example, the wavelength spacing information, the outer edge approach information and the phase detection sensitivity monitor value (or information indicating the degradation degree) are superimposed as a frequency modulation component on the main signal light to be received by the receiver 82 corresponding to the intermediate channel (e.g., receivers B1 and C1 of FIG. 23).

The frequency modulation component is detected by the FM detector 820 or the carrier frequency offset monitor 830, and the detection result is decoded by the frequency modulation pattern decoder 831. Thus, the information superimposed on the main signal light is decoded (Operation P62).

Meanwhile, any of the wavelength spacing information, the outer edge approach information and the phase detection sensitivity monitor value may be transmitted, as described above, by a different communication path from the main signal light, in which case each information is acquired by the receiver 82 by the reception processing according to the communication path.

The decoded (or acquired) information is provided to the wavelength control amount calculator 841 of the monitoring controller 84. The wavelength control amount calculator 841 calculates the wavelength control amount and control direction of the transmission light source 814 of the transmitter 81 based on the decoded wavelength spacing information (Operation P63).

In addition, the wavelength control amount calculator 841 determines whether the phase detection sensitivity of the intermediate channel has been degraded based on the phase detection sensitivity monitor value (or information indicating the degradation degree) of the intermediate channel (Operation P64). Meanwhile, the determination Operation P64 may be carried out before Operation P63. The degradation determination of the phase detection sensitivity in the determination Operation P64 may be performed using a threshold value.

The degradation determination may be performed based on the phase detection sensitivity level (e.g., the same as when the wavelength shift amount of FIG. 17 is "0"), for example, when receiving a design value or a signal which is not subjected to spectral narrowing during the performance evaluation of the production test. Based on this, the "degradation" may be determined when the phase detection sensitivity level is lower than the threshold value. The threshold value may be set as a design value of the allowable range amount of the degradation.

As a result of the degradation determination of the phase detection sensitivity, if it may be determined as "no degradation" (NO in Operation P64), the wavelength control amount calculator 841 may perform Operations P65 to P70 in the same manner as Operations P44 to P49 of FIG. 22 of the second embodiment.

For example, the wavelength control amount calculator 841 checks whether the outer edge approach information indicates "presence of outer edge approach" (Operation P65).

As a result of the checking, if the outer edge approach information does not indicate "presence of outer edge approach" (NO in Operation P65), the wavelength control amount calculator 841 may control the transmission wavelength of the transmitter 81 (transmitter D2) corresponding to the outer edge channel with the calculated wavelength control amount and control direction (Operation P67).

In the meantime, if the outer edge approach information indicates "presence of outer edge approach" (YES in Operation P65), the wavelength control amount calculator 841 determines whether the wavelength control direction is a direction approaching the WSS transmission band (Operation P66).

As a result of the determination, if the wavelength control direction is a direction away from the outer edge of the WSS transmission band (NO in Operation P66), the wavelength control amount calculator 841 may control the transmission wavelength of the transmitter D2 with the wavelength control amount and control direction calculated in Operation P63 (Operation P67).

In contrast, if the wavelength control direction is a direction approaching the outer edge of the WSS transmission band (YES in Operation P66), the wavelength control amount calculator 841 determines whether there is a margin in the in the approach distance of the outer edge on the opposite side based on the outer edge approach distance information obtained in Operation P62 (Operation P68).

For example, if the outer edge channel CH4 on the long wavelength side approaches the outer edge of the long wavelength side of the WSS transmission band, it is determined whether there is an outer peripheral margin between the outer edge channel CH1 on the short wavelength side and the outer edge of the short wavelength side of the WSS transmission band.

As a result of the determination, if there is an outer peripheral margin on the opposite side (YES in Operation P68), the wavelength control amount calculator 841 may control the transmission wavelength of each transmitter 81, for example, such that all the channels CH1 to CH4 are separated from the outer edge of the long wavelength side of the WSS transmission band (Operation P69). In this case, the wavelength control amount (shift amount) may be in a range such that the phase detection sensitivity monitor value for the outer edge channel (e.g., channel CH1) on the opposite side does not fall below a threshold value.

In the meantime, if there is no outer peripheral margin on the opposite side (NO in Operation P68), the wavelength control amount calculator 841 may not perform (may stop) the control of the transmission wavelength of each transmitter 81 (Operation P70).

Alternatively, the wavelength control amount calculator 841 may control the transmission wavelength in a direction away from the outer edge with respect to only the transmitter 81 (e.g., transmitter D2) corresponding to the outer edge channel (e.g., outer edge channel CH4 on the long wavelength side) approaching the outer edge of the WSS transmission band.

In the meantime, in Operation P64, if it is determined that the phase detection sensitivity of the intermediate channel has been degraded (YES in Operation P64), the wavelength control amount calculator 841 may determine that the phase detection sensitivity of the outer edge channel also has been degraded due to a factor other than the outer edge approach.

For example, since it indicates that the main signal light of the intermediate channel is transmitted and received at a wavelength sufficiently distant from the outer edge of the WSS transmission band, it may be determined that the phase detection sensitivity of the intermediate channel is not reduced by the band restriction of the outer edge of the WSS transmission band.

Therefore, if the phase detection sensitivity of the intermediate channel has been degraded, the wavelength control amount calculator 841 may determine that the phase detection sensitivity of the outer edge channel also has been degraded due to a factor other than the outer edge approach, and may not control the transmission wavelength of each transmitter 82 (A2, B2, C2, and D2).

In other words, even though the outer edge approach information indicates "presence of outer edge approach," the wavelength control amount calculator 841 may disregard the information and stop the transmission wavelength control of each transmitter 82 (A2, B2, C2, and D2). Thus, it is possible to prevent the implementation of unnecessary transmission wavelength control.

As described above, in the third embodiment, in addition to the operation of the second embodiment, by monitoring the phase detection sensitivity of the intermediate channel, it may be determined whether a reduction in the phase detection sensitivity of the outer edge channel is caused by the approach to the outer edge of the WSS transmission band, or a factor other than the outer edge approach.

Therefore, in addition to obtaining the same effects as the first and second embodiments described above, it is possible to prevent an erroneous determination by monitoring the phase detection sensitivity only for the outer edge channel, thereby avoiding the implementation of unnecessary transmission wavelength control. Thus, for example, it is possible to reduce power consumption relating to the transmission wavelength control. The third embodiment may be combined with the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
   an optical transmission node configured to transmit wavelength-multiplexed light of a plurality of wavelengths arranged in a predetermined transmission band; and
   an optical reception node configured to receive the wavelength-multiplexed light, and to include
   a monitor configured to monitor a detection sensitivity indicating a sampling phase shift with respect to a phase of light corresponding to one among the plurality of wavelengths in the received wavelength-multiplexed light, and
   a transmitter configured to transmit information indicating that the detection sensitivity monitored by the monitor for light corresponding to a first wavelength adjacent to a first outer edge of the transmission band, among the plurality of wavelengths, has been reduced below a first threshold value, to the optical transmission node,
   wherein the optical transmission node includes
   a receiver configured to receive information indicating a reduction in the detection sensitivity, and
   a controller configured to stop wavelength control of shifting the first wavelength adjacent to the first outer edge in a direction approaching the first outer edge in response to reception of the information.

2. The optical transmission system according to claim 1, wherein the controller of the optical transmission node shifts the first wavelength adjacent to the first outer edge in a direction away from the first outer edge of the transmission band.

3. The optical transmission system according to claim 1, wherein the controller of the optical transmission node shifts each of the plurality of wavelengths including the first wavelength adjacent to the first outer edge in a direction away from the first outer edge of the transmission band.

4. The optical transmission system according to claim 3, wherein the transmitter of the optical reception node transmits information, obtained based on the detection sensitivity for a second wavelength adjacent to a second outer edge of the transmission band on an opposite side of the first wavelength adjacent to the first outer edge, indicating a distance between the second wavelength and the second outer edge, to the optical transmission node,
   wherein the receiver of the optical transmission node receives information indicating the distance between the second wavelength and the second outer edge, and
   wherein the controller of the optical transmission node performs the wavelength control of shifting each of the plurality of wavelengths in a direction away from the first outer edge of the transmission band only if it is determined that the distance satisfies a predetermined margin.

5. The optical transmission system according to claim 1,
   wherein the transmitter of the optical reception node transmits a monitoring result of the detection sensitivity for a third wavelength not adjacent to the first outer edge among the plurality of wavelengths to the optical transmission node,
   wherein the receiver of the optical transmission node receives the monitoring result, and
   wherein the controller of the optical transmission node stops the wavelength control of the first wavelength adjacent to the first outer edge if the monitoring result is reduced below a second threshold value.

6. A wavelength control method comprising:
   transmitting wavelength-multiplexed light of a plurality of wavelengths arranged in a predetermined transmission band, by an optical transmission node;
   receiving the wavelength-multiplexed light, by an optical reception node;
   monitoring a detection sensitivity indicating a sampling phase shift with respect to a phase of light corresponding to one among the plurality of wavelengths in the received wavelength-multiplexed light, by the optical reception node;
   transmitting information indicating that the monitored detection sensitivity for light corresponding to a wavelength adjacent to an outer edge of the transmission band, among the plurality of wavelengths, has been reduced below a threshold value, to the optical transmission node, by the optical reception node; and
   stopping wavelength control of shifting the wavelength adjacent to the outer edge in a direction approaching the outer edge in response to reception of information indicating a reduction in the detection sensitivity, by the optical transmission node.

7. A node configured to receive first wavelength-multiplexed light including light of a plurality of wavelengths arranged in a predetermined transmission band from an opposing node, and to transmit second wavelength-multiplexed light including light of a plurality of wavelengths arranged in a predetermined transmission band to the opposing node, the node comprising:
   a monitor configured to monitor a detection sensitivity indicating a sampling phase shift with respect to a phase of light corresponding to one among the plurality of wavelengths in the received wavelength-multiplexed light;
   a transmitter configured to transmit information indicating that the detection sensitivity monitored by the monitor for light corresponding to a first wavelength adjacent to a first outer edge of the transmission band, among the plurality of wavelengths, has been reduced below a first threshold value, to the opposing node;

a receiver configured to receive information transmitted by the opposing node and indicating that the detection sensitivity monitored by the monitor of the opposing node for light corresponding to the wavelength adjacent to the first outer edge of the transmission band, among the plurality of wavelengths, has been reduced below the first threshold value; and a controller configured to stop wavelength control of shifting the first wavelength adjacent to the first outer edge in a direction approaching the first outer edge in response of reception of the information.

8. The node according to claim 7,
wherein the transmitter transmits information, obtained based on the detection sensitivity for a second wavelength adjacent to a second outer edge of the transmission band on an opposite side of a first wavelength adjacent to the first outer edge, indicating a distance between the second wavelength and the second outer edge, to the optical transmission node.

9. The node according to claim 7,
wherein the transmitter transmits a monitoring result of the detection sensitivity for a third wavelength not adjacent to the first outer edge among the plurality of wavelengths to the optical transmission node.

10. The node according to claim 7,
wherein the controller shifts the first wavelength adjacent to the first outer edge in a direction away from the first outer edge of the transmission band.

11. The node according to claim 7,
wherein the controller shifts each of the plurality of wavelengths including the first wavelength adjacent to the first outer edge in a direction away from the first outer edge of the transmission band.

12. The node according to claim 11,
wherein the receiver receives information, obtained based on the detection sensitivity for a second wavelength adjacent to a second outer edge of the transmission band on an opposite side of a first wavelength adjacent to the outer edge in the opposing node, indicating a distance between the second wavelength and the second outer edge, and wherein the controller performs the wavelength control of shifting each of the plurality of wavelengths in a direction away from the first outer edge of the transmission band only if it is determined that the distance satisfies a predetermined margin.

13. The node according to claim 7,
wherein the receiver receives a monitoring result of the detection sensitivity for a third wavelength not adjacent to the first outer edge among the plurality of wavelengths, from the opposing node, and wherein the controller stops the wavelength control of the first wavelength adjacent to the first outer edge if the monitoring result is reduced below a second threshold value.

* * * * *